United States Patent
Stieha et al.

(10) Patent No.: US 11,845,024 B2
(45) Date of Patent: Dec. 19, 2023

(54) MODULAR FILTRATION DEVICE AND SYSTEM

(71) Applicant: PowerTech Water, Inc., Lexington, KY (US)

(72) Inventors: Joseph Stieha, Lexington, KY (US); Keith Jacobs, Loveland, OH (US)

(73) Assignee: PowerTech Water, Inc., Lexington, KY (US)

( * ) Notice: Subject to any disclaimer, the term of this patent is extended or adjusted under 35 U.S.C. 154(b) by 63 days.

(21) Appl. No.: 17/384,048

(22) Filed: Jul. 23, 2021

(65) Prior Publication Data

US 2022/0023780 A1    Jan. 27, 2022

Related U.S. Application Data

(60) Provisional application No. 63/056,836, filed on Jul. 27, 2020.

(51) Int. Cl.
*B01D 35/06* (2006.01)
*B01D 29/52* (2006.01)
(Continued)

(52) U.S. Cl.
CPC ............ *B01D 35/06* (2013.01); *B01D 29/52* (2013.01); *B01D 46/001* (2013.01);
(Continued)

(58) Field of Classification Search
CPC ...... B01D 35/06; B01D 29/52; B01D 46/001; B01D 46/4227; B01D 46/4245;
(Continued)

(56) References Cited

U.S. PATENT DOCUMENTS 4,915,831 A * 4/1990 Taylor ................ B01D 35/30
55/504
5,895,570 A * 4/1999 Liang ................ B01D 35/303
210/232
(Continued)

FOREIGN PATENT DOCUMENTS

EP    1423179 B1    6/2004
EP    2536477 B1 *  7/2021 ............ B01D 27/00
(Continued)

OTHER PUBLICATIONS

Notification of Transmittal of the International Search Report and the Written Opinion of the International Searching Authority, Application No. PCT/US2021/042963, dated Oct. 19, 2021, 14 pages.
(Continued)

*Primary Examiner* — Waqaas Ali
(74) *Attorney, Agent, or Firm* — Tina M. Dorr; Barnes & Thornburg LLP

(57) ABSTRACT

A modular filtration device is composed of a modular docking plate having at least one quick disconnect plumbing coupling; at least one electrical connector; and at least one alignment feature for aligning and receiving a modular filter; and a modular filter composed of a docking face having: at least one quick disconnect plumbing coupling; at least one electrical connector; and at least one alignment feature that mates with an alignment feature of the modular docking plate to provide proper alignment of the filter with the docking plate, engagement of the quick disconnect plumbing couplings, engagement of the electrical connectors, and engagement of the locking mechanism. The modular filtration device comprises a locking mechanism to hold the filter in place during operation. A modular filtration system is composed of a plurality of the filtration devices.

26 Claims, 25 Drawing Sheets

(51) Int. Cl.
  *B01D 46/00* (2022.01)
  *B01D 46/42* (2006.01)
  *B01D 61/48* (2006.01)
(52) U.S. Cl.
  CPC ..... *B01D 46/4227* (2013.01); *B01D 46/4245* (2013.01); *B01D 61/48* (2013.01); *B01D 2201/295* (2013.01); *B01D 2313/131* (2022.08)
(58) Field of Classification Search
  CPC .............. B01D 61/48; B01D 2201/295; B01D 2313/025; B01D 2313/13; B01D 61/52; C02F 2201/004; C02F 2201/006; C02F 2201/007; C02F 1/4693; C02F 1/4691
  See application file for complete search history.

(56) References Cited

U.S. PATENT DOCUMENTS

| | | | |
|---|---|---|---|
| 6,120,685 A * | 9/2000 | Carlson | C02F 9/20 210/DIG. 17 |
| 7,455,542 B2 | 9/2008 | Norwood et al. | |
| 7,442,301 B2 | 10/2008 | Huda | |
| 7,988,479 B2 | 8/2011 | Hankins et al. | |
| 9,789,424 B2 | 10/2017 | Reckin et al. | |
| 10,246,356 B2 | 4/2019 | Van Der Wal et al. | |
| 10,421,032 B2 | 9/2019 | Foix et al. | |
| 10,786,768 B2 | 9/2020 | Fritz | |
| 10,793,450 B2 | 10/2020 | Gao et al. | |
| 2011/0303543 A1* | 12/2011 | Fritze | B01D 35/153 204/554 |
| 2016/0167984 A1 | 6/2016 | Gao et al. | |
| 2018/0334936 A1 | 11/2018 | Schaller | |
| 2019/0388811 A1 | 12/2019 | Huda et al. | |
| 2020/0024158 A1 | 1/2020 | Boehme et al. | |

FOREIGN PATENT DOCUMENTS

| | | | |
|---|---|---|---|
| KR | 101318423 B1 | | 10/2013 |
| KR | 101482656 B1 | * | 1/2015 |
| WO | 2011101652 A2 | | 8/2011 |

OTHER PUBLICATIONS

"Bayonet Coupling"; Halberd Bastion Pty Ltd; 2021; Accessed Jul. 26, 2021; https://halberdbastion.com/resources/hardware/rf-connectors/rf-connector-coupling/bayonet-coupling.

"Clean-break quick coupling with bayonet locking HCB"; Staubli International AG.; 2021; Accessed Jul. 26, 2021; https://www.staubli.com/en/connectors/quick-couplings/fluids-and-gases/hcb-non-spill-316l/.

Brita "Redi-Twist" 1-stage under Sink Filtration System; Mar. 21, 2013; https://www.youtube.com/watch?v=2AkulHH3iBI.

How to Install Cartridges in a Thermo Scientific Barnstead B-Pure Water Purification System; Dec. 11, 2015; https://www.youtube.com/watch?v=0zjc320tHks.

Locking Mechanisms Applicable to Connectors; Jan. 20, 2017; https://youtu.be/UP3XSTd9VDK?t=74.

* cited by examiner

MODULAR FILTRATION DEVICE AND SYSTEM

CROSS REFERENCE TO RELATED APPLICATION

This application claims benefit of U.S. Provisional Application No. 63/056,836 filed Jul. 27, 2020 and is incorporated herein by reference in its entirety.

BACKGROUND

The present disclosure relates to modular filtration devices and systems. The filtration systems are designed for quick replacement. Filtration devices can be used to purify fluids, for example for the purification of aqueous solutions. Filtration devices are used to purify fluids, i.e. liquids and gases, in commercial, industrial and residential applications. The filter medium, which is selected to remove specific contaminants, is often located in an enclosed container which allows a fluid to be directed into the container, to come in contact with the filter medium, and to be released out of the container in a purified state. An advantage of having the filter medium enclosed within a container is that the container often entrains or otherwise captures contaminants and a spent filter medium can be disposed together with its container, allowing for clean and safe removal and disposal of the contaminated filter medium. Liquid filtration devices are used in many industries, for example as blood filters in the medical industry, as oil filters in combustion engines, as fuel filters in fuel lines and tanks, and as water filters in desalination plants, home water supplies, and refrigerators. Examples of filtration devices for purification of gases include for example air filters in furnaces, masks and canisters that are used to purify breathing air in respirators, automotive intake and catalytic exhaust filters, refrigerator air filtration devices, and whole room HEPA filtration devices. The design of the various filter media and filtration devices depends upon the specific industry and end-use application.

Although enclosing the filter medium within a container provides for clean and safe removal and disposal of contaminated filter media, there is room for improvement in the ease of installing and removing (mounting and dismounting) filters. Prior art filters are often designed to be installed and removed by rotation of the filter along its longitudinal axis. However, this may not be practical for filters with a plurality of plumbing couplings and electrical connectors, and filter rotation may be laborious and impractical for large and heavy filters. Instead, the filter should be mountable only in a unique orientation relative to its docking plate in which plumbing couplings and any electrical connectors present all line up. Moreover, the filter should be easily and quickly installed and removed, without the need for rotation of the filter around its longitudinal axis. Also, the filtration devices should be combinable into modular filtration systems in which the filtration devices pack in close proximity to each other.

SUMMARY

For a more complete understanding of this disclosure, reference is now made to the following brief description, taken in connection with the accompanying drawings and detailed description.

A modular filtration device comprises a modular docking plate comprising: at least one quick disconnect plumbing coupling; at least one electrical connector; at least one alignment feature for aligning and receiving a modular filter; optionally, a power supply that provides power to the filter; and a modular filter comprising a docking face comprising: at least one quick disconnect plumbing coupling; at least one electrical connector; and at least one alignment feature that mates with an alignment feature of the modular docking plate to provide proper alignment of the filter with the docking plate, engagement of the quick disconnect plumbing couplings of the docking plate and the filter, engagement of the electrical connectors of the docking plate and the filter, and engagement of the locking mechanism; wherein the modular filtration device comprises a locking mechanism to hold the filter in place during operation. A modular filtration system comprises a plurality of the filtration devices.

Other embodiments and aspects of the modular filtration devices and systems are described in detail herein. Additional unnamed features and advantages may be associated with the modular filtration devices and systems. Drawings are provided which, in conjunction with the Detailed Description, provide a better understanding of the modular filtration devices and modular filtration systems.

BRIEF DESCRIPTION OF THE DRAWINGS

For a more complete understanding of this disclosure, reference is made to the drawings, wherein like reference numerals represent like parts:

FIG. 21A shows the engaged position, with ball 20 engaged with detent 21, while FIG. 21B shows the disengaged position, with ball 20 disengaged from detent 21.

DETAILED DESCRIPTION

Disclosed herein are modular filtration devices and systems. The modular filters disclosed herein are mountable only in a unique orientation relative to their complementary docking plate. In this way, all plumbing couplings and any electrical connectors present all line up for coupling. Moreover, the modular filter is easily and quickly installed and removed, without the need for rotation of the filter around its longitudinal axis. Also, the filtration devices are combinable into modular filtration systems in which the filtration devices pack in close proximity to each other.

For the sake of brevity, conventional techniques related to modular filtration devices and systems, and their manufacture, assembly, and use may or may not be described in detail herein. Moreover, the various tasks and process steps described herein can be incorporated into a more comprehensive procedure or process having additional steps or functionality not described in detail herein.

"Annular" means pertaining to, or having the form of, a ring; ring-shaped; or in the shape of an annulus. "Electrode" refers to a material which is electrically conductive. For brevity, "filter" and "modular filter" are used interchangeably herein. "Docking plate" and "modular docking plate" are also used interchangeably herein. "Modular filtration device" and "filtration device" are also used interchangeably herein. "Modular filtration system" and "filtration system" are also used interchangeably herein. In reference to the ball detent mechanism, "detent" and "locking cavity" are also used interchangeably herein.

A modular filtration device comprises a modular docking plate comprising: at least one quick disconnect plumbing coupling; at least one electrical connector; at least one alignment feature for aligning and receiving a modular filter; optionally, a power supply that provides power to the filter; and a modular filter comprising a docking face comprising: at least one quick disconnect plumbing coupling; at least one electrical connector; and at least one alignment feature that mates with an alignment feature of the modular docking plate to provide proper alignment of the filter with the docking plate, engagement of the quick disconnect plumbing couplings of the docking plate and the filter, engagement of the electrical connectors of the docking plate and the filter, and engagement of the locking mechanism; wherein the modular filtration device comprises a locking mechanism to hold the filter in place during operation.

Figure 4:
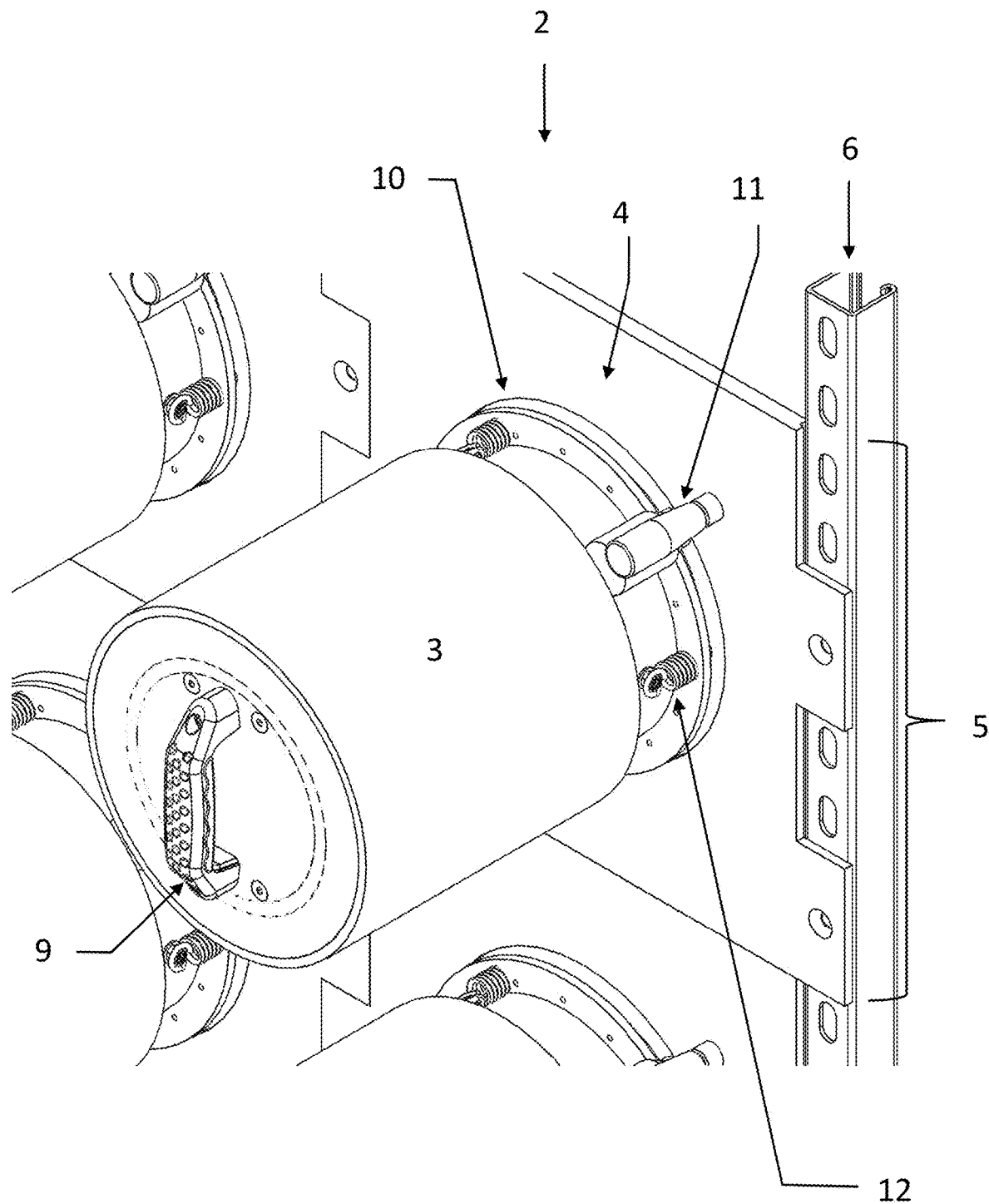
FIG. 4 is a front isometric view of the modular filtration device 2 showing modular docking plate 4 and an installed modular filter 3, with locking ring 10 and locking mechanism 12.
Figure 8:
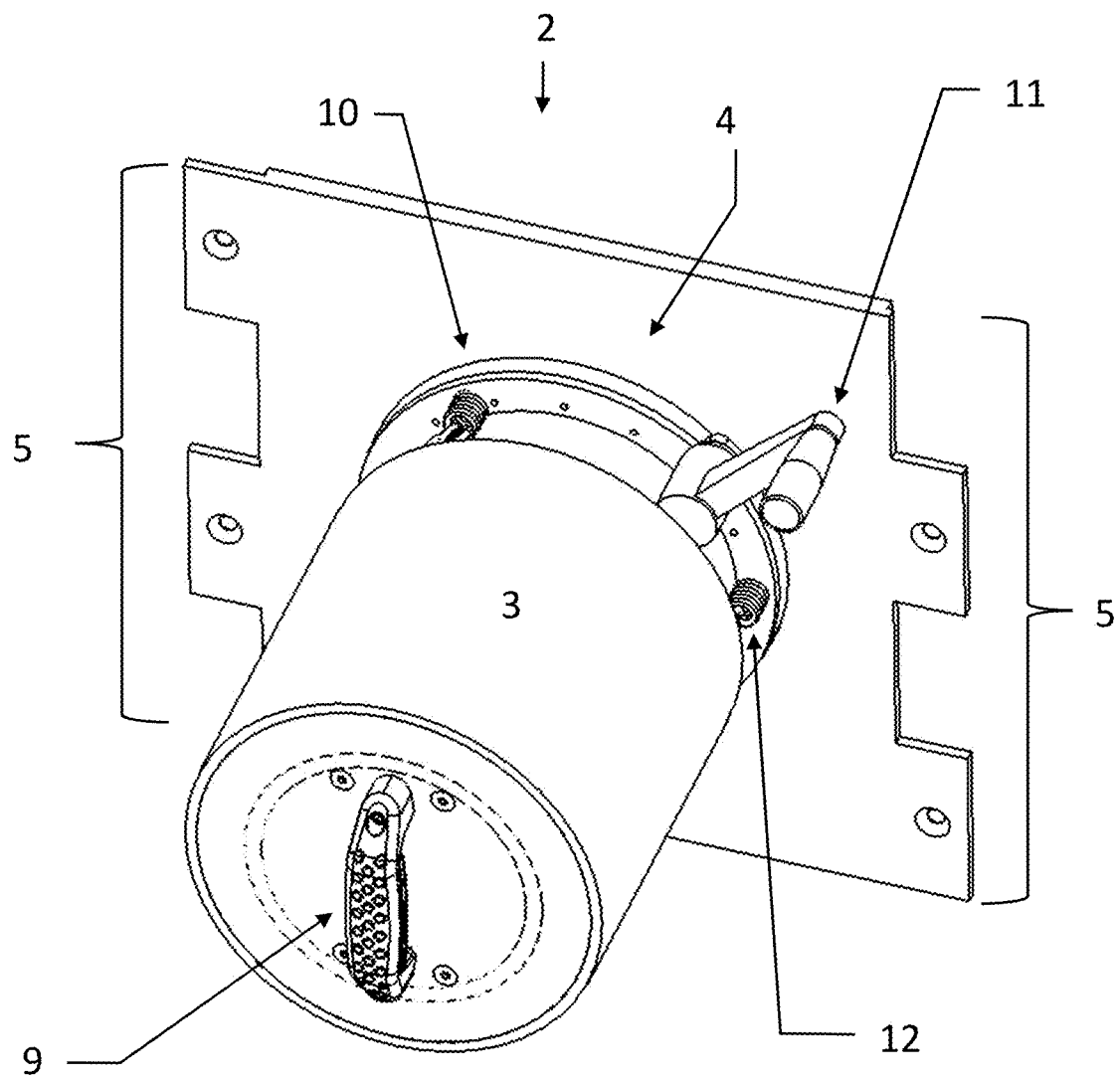
FIG. 8 is a front isometric view of a modular filtration device 2 showing modular docking plate 4 with interleaving features 5, locking ring 10, and modular filter 3.

Embodiments of the modular filtration device 2 are illustrated in part by FIG. 4 and by FIG. 8, in which the modular filter 3 is docked with modular docking plate 4, having ball detent 12. The modular docking plate 4 comprises a locking ring 10 which can rotate around the longitudinal axis of the filter 3 to dock and undock the filter 3. The modular filter further comprises a handle 9, for docking/undocking by hand or by other mechanical docking/undocking means. The modular docking plate 4 further comprises a locking ring handle 11 to facilitate rotation of the locking ring by hand or other mechanical means. The ball detent 12 serves to establish fixed opened and closed positions for locking ring 10 by way of a ball protruding from the bottom of the locking ring 10 which engages with different detents (cavities) in the docking plate 4 at the opened and closed positions of the locking ring. (The ball and detent are not visible in FIGS. 4 and 8.) The ball engages into the detent by spring-action. In FIG. 8, the filtration device 2 is free-standing, while in FIG. 4, the filtration device 2 is mounted to structural element 6. The modular filter comprises a handle 9 to facilitate handling of the filter during mounting and dismounting (installation and removal). Handle 9 is also identified in FIG. 19.

Figure 18:
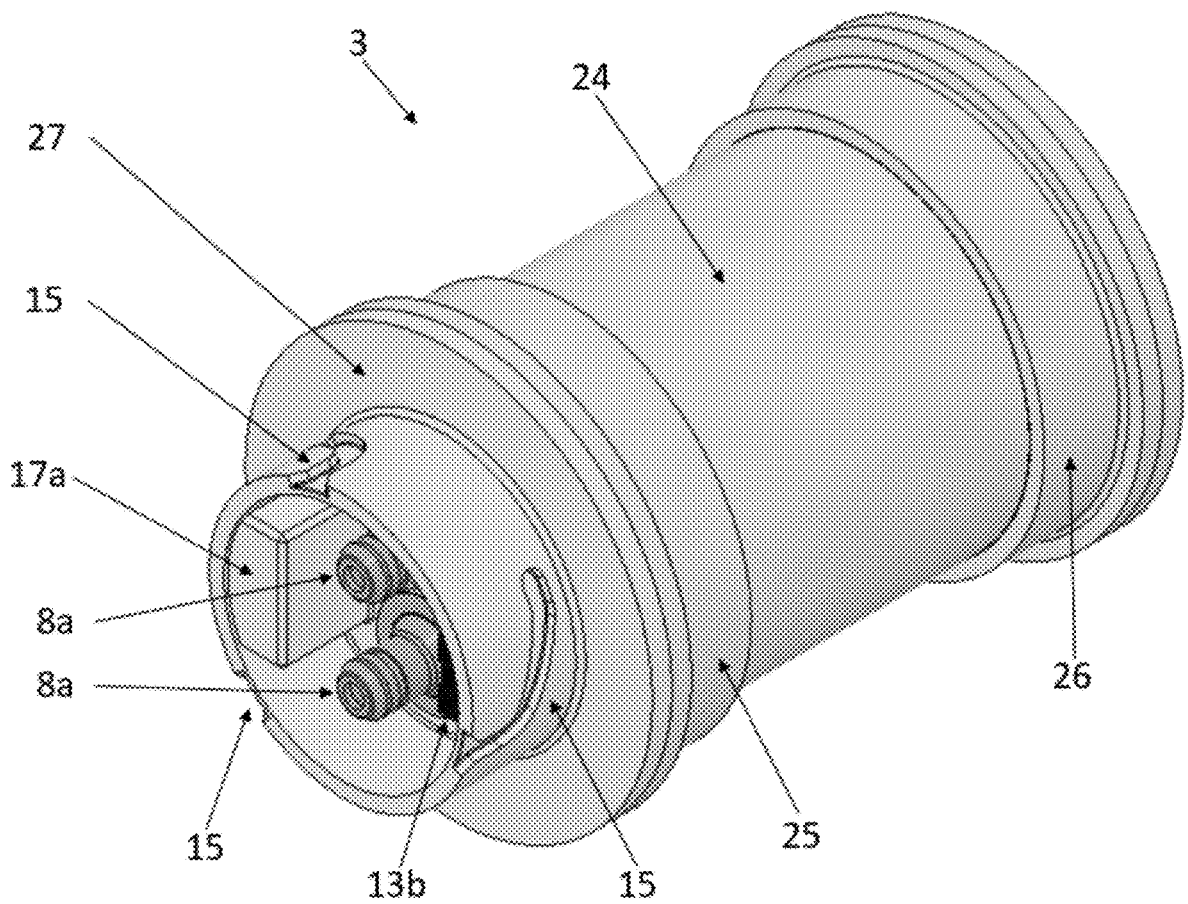
FIG. 18 is a front isometric view of a modular filter 3 showing outer cylinder 24, front cap 25, back cap 26, and spiral groove 15.
Figure 19:
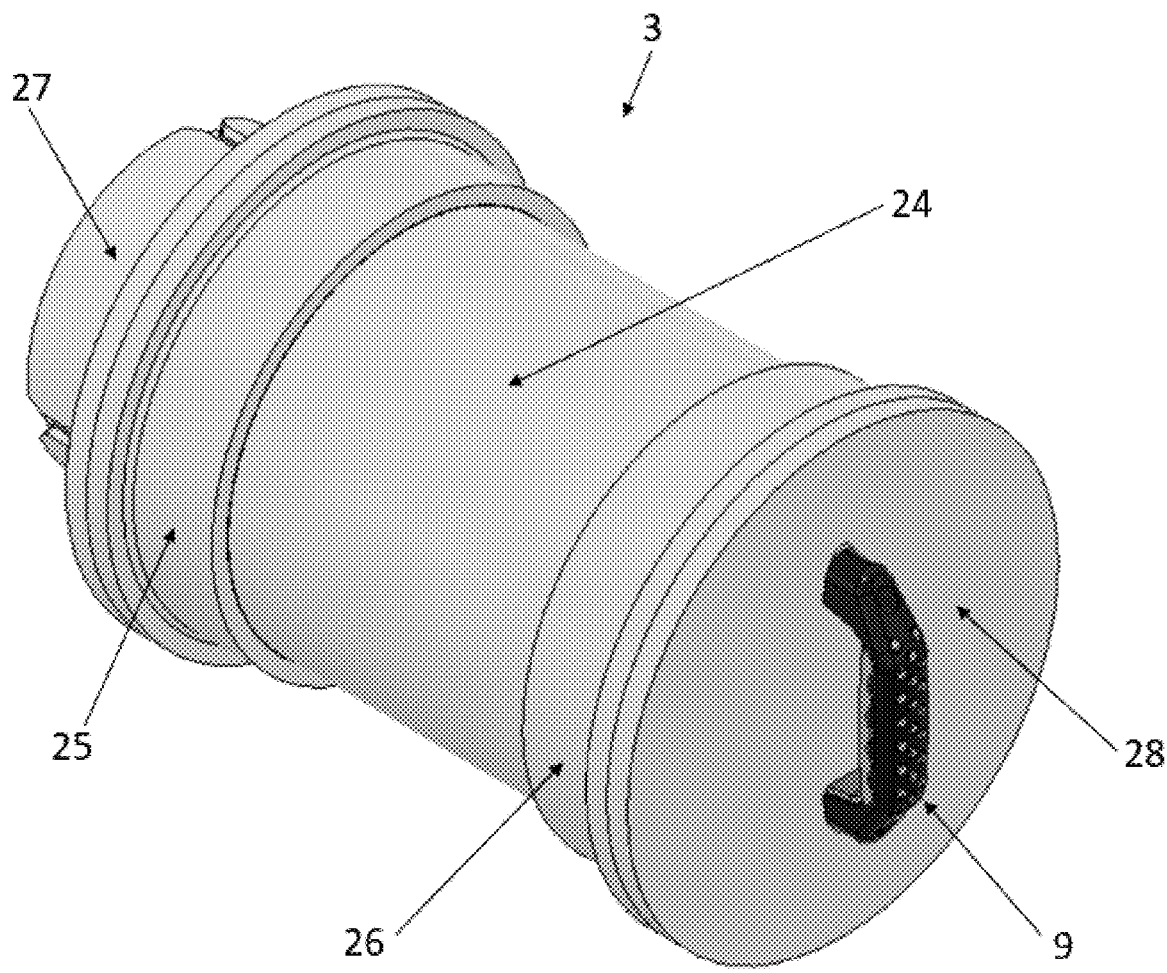
FIG. 19 is a back isometric view of a modular filter 3 showing outer cylinder 24, front cap 25, back cap 26, detachable docking face 28, and detachable hand plate 28.

Embodiments of the modular filter are illustrated in FIGS. 18 and 19. FIG. 18 is a front isometric view of a modular filter 3 showing outer cylinder 24, front cap 25, back cap 26, and spiral groove 15. Male key block 17a, quick disconnect plumbing connectors 8a, and sink electrical connector 13b are also shown. FIG. 19 is a back isometric view of modular filter 3 showing outer cylinder 24, front cap 25, back cap 26, detachable docking face 28, and detachable hand plate 28. The outer cylinder 24, front cap 25, back cap 26, detachable docking face 28, and detachable hand plate 28 can be made of a polymer, e.g., polyvinyl chloride (PVC).

Figure 2:
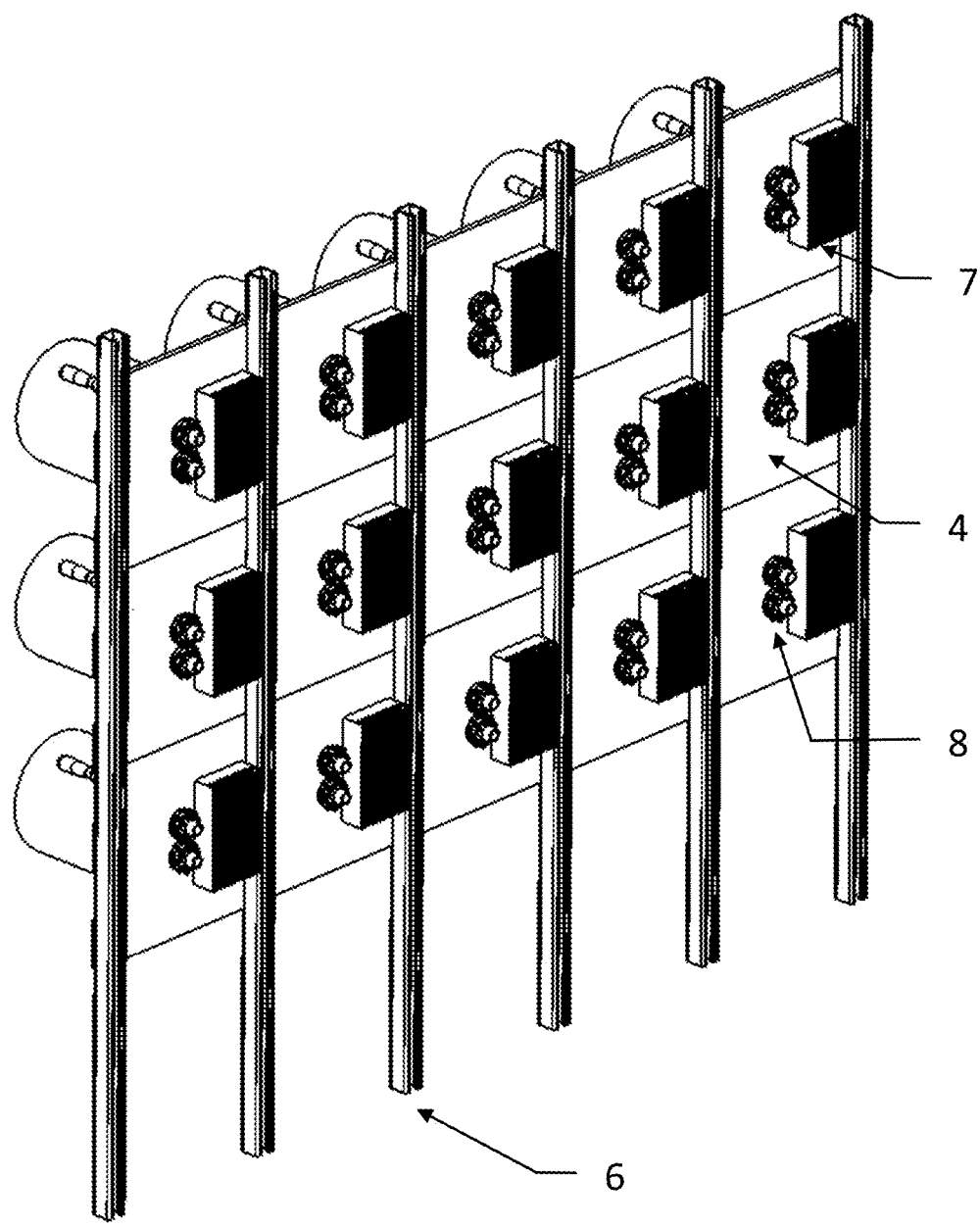
FIG. 2 is a back isometric view of the modular filtration system 1 showing an array of filtration devices mounted on structural elements 6, showing the back of docking plates 4, power supply 7 and back plumbing connectors 8.
Figure 3:
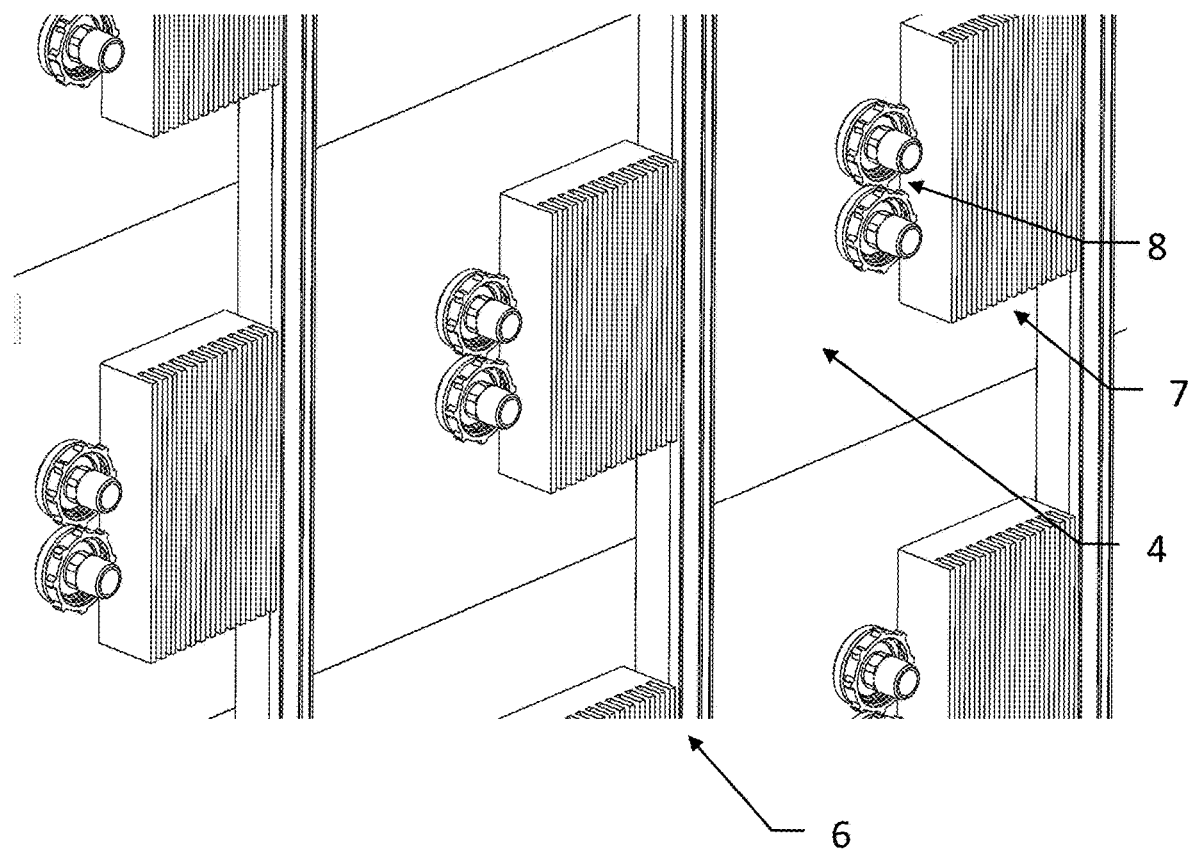
FIG. 3 is an enlarged isometric back view of the modular filtration system showing power supply 7 and back plumbing connectors 8.
Figure 7:
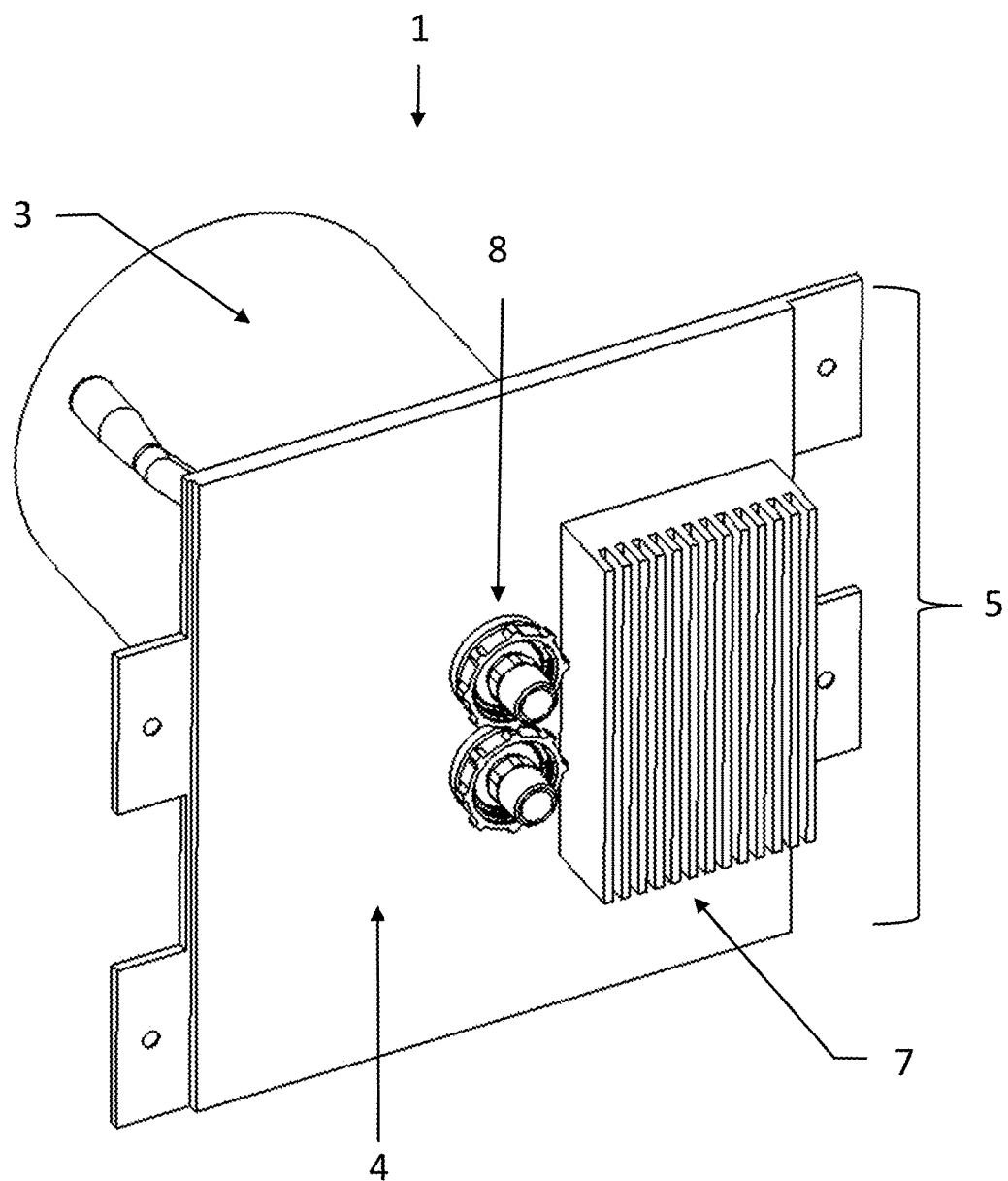
FIG. 7 is a back isometric view of a single modular filtration device 2 showing modular docking plate 4 with interleaving features 5, and modular filter 3.

FIG. 7 is a back isometric view of a single modular filtration device 2 showing modular docking plate 4, with interleaving features 5, and modular filter 3. FIG. 7 also shows plumbing connectors 8 for fluid inlet and outlet and power supply 7 to provide power to the filter. FIG. 2 is a back isometric view of the modular filtration system 1. FIG. 2 shows a plurality of modular filters mounted to structural elements 6. As in FIG. 7, the back of docking plates 4 comprise plumbing connectors 8 for fluid inlet and outlet and power supply 7 to provide power to the filter, for example, to deionization cells in the filter. FIG. 3 is an enlargement of a portion of FIG. 2, also showing plumbing connectors 8 for fluid inlet and outlet and power supply 7 to provide power to the filter.

Figure 16:
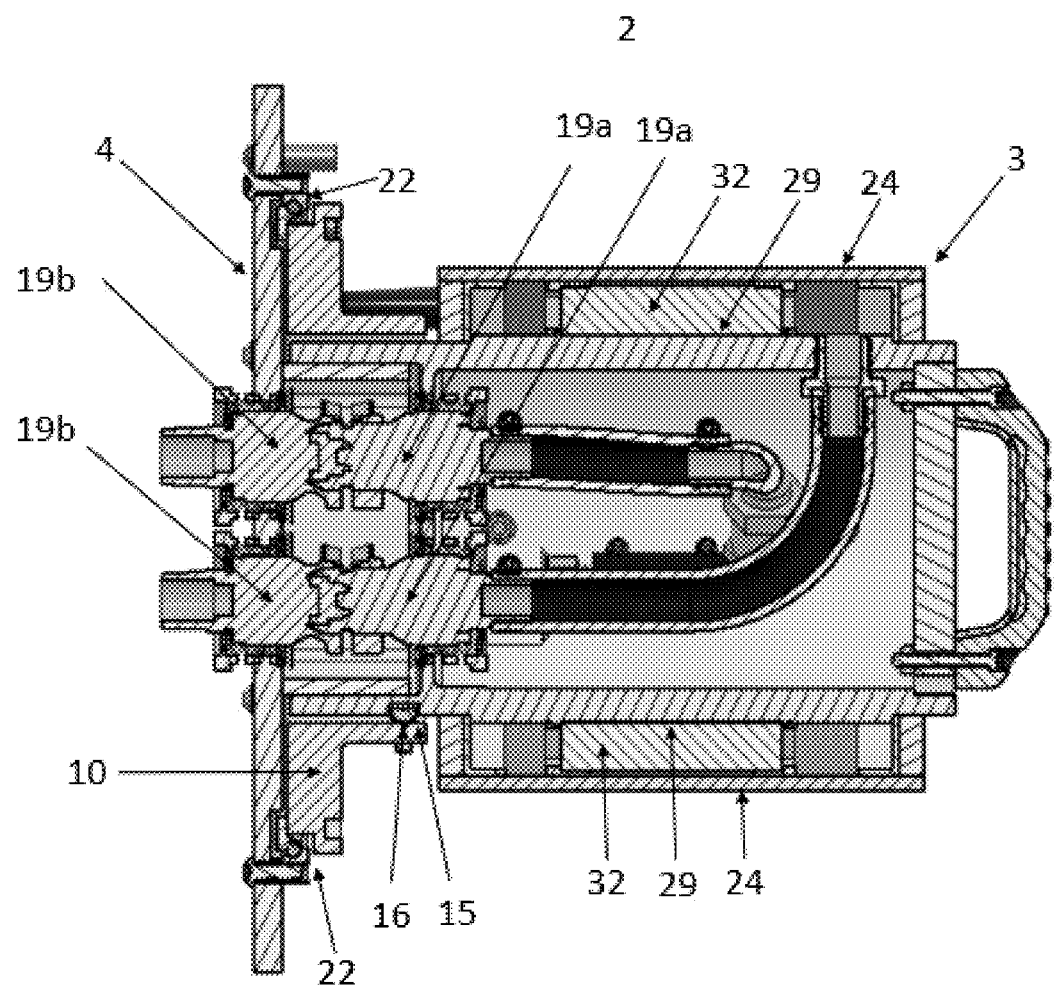
FIG. 16 is a side cross-sectional view of a modular filtration device 2 showing modular filter 3 docked with modular docking plate 10. Engaged shut-off couplings 19a (male) and 19b (female), and other features, are shown.

An advantage of the modular filtration device is that the modular filter can be quickly replaced. The ease of replacing the modular filter is in part due to the use of quick disconnect plumbing couplings and electrical connectors, which are designed to quickly engage and disengage so that the modular filter can be quickly replaced. In some embodiments, the quick disconnect plumbing couplings are shut-off couplings. Advantageously, when the quick disconnect couplings are shut-off couplings, the modular filters can be replaced without turning off the aqueous stream pressure on either the inlet our outlet side of the couplings. Engaged shut-off couplings 19*a* (male) and 19*b* (female) are shown in FIG. 16, which is a side cross-sectional view of a modular filtration device 2 showing modular filter 3 docked with modular docking plate 10.

Figure 9:
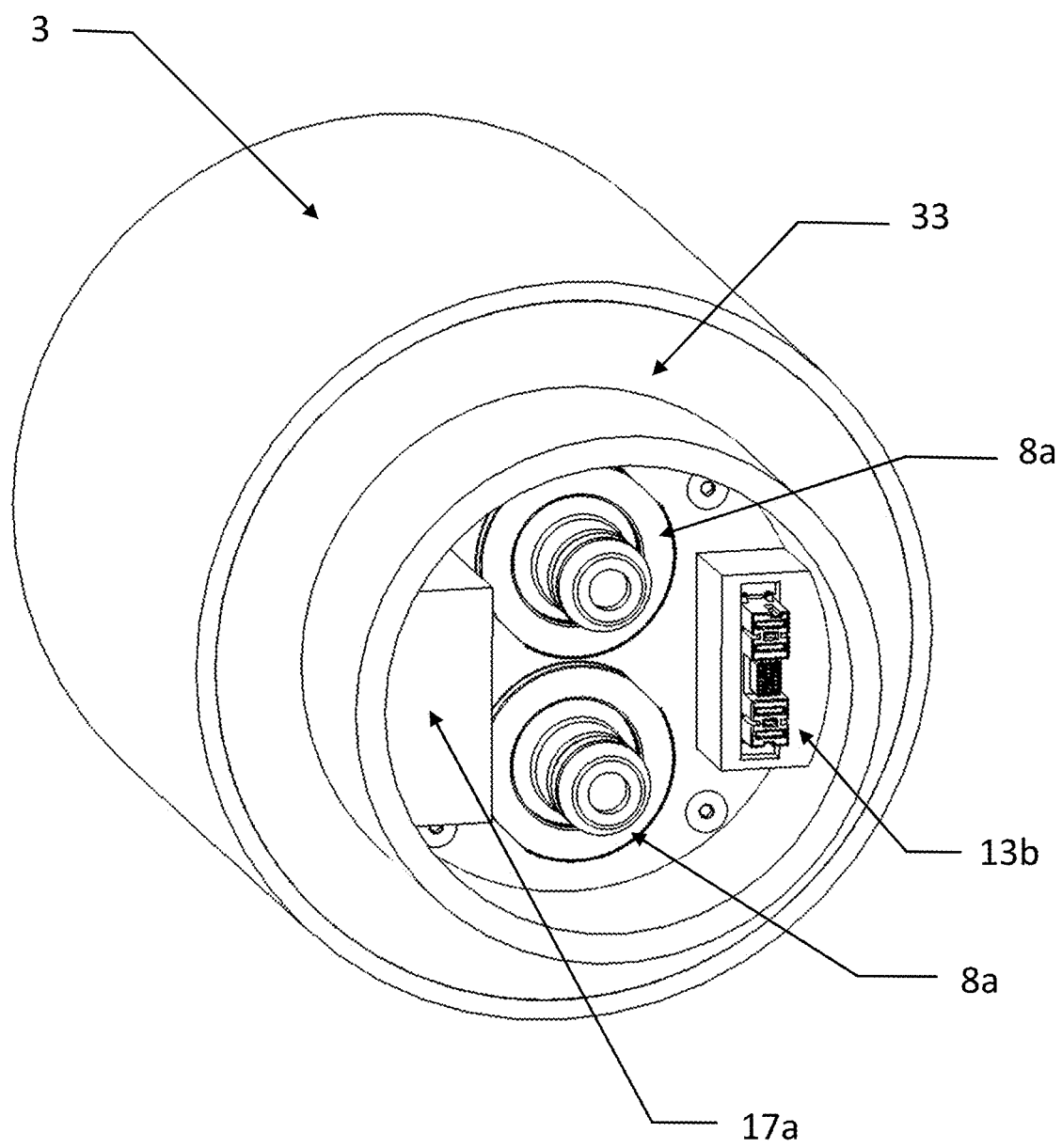
FIG. 9 is a back isometric view of a modular filter 3 showing quick disconnect plumbing couplings 8a, electrical connector (sink) 13b and alignment feature (key block) 14.
Figure 10:
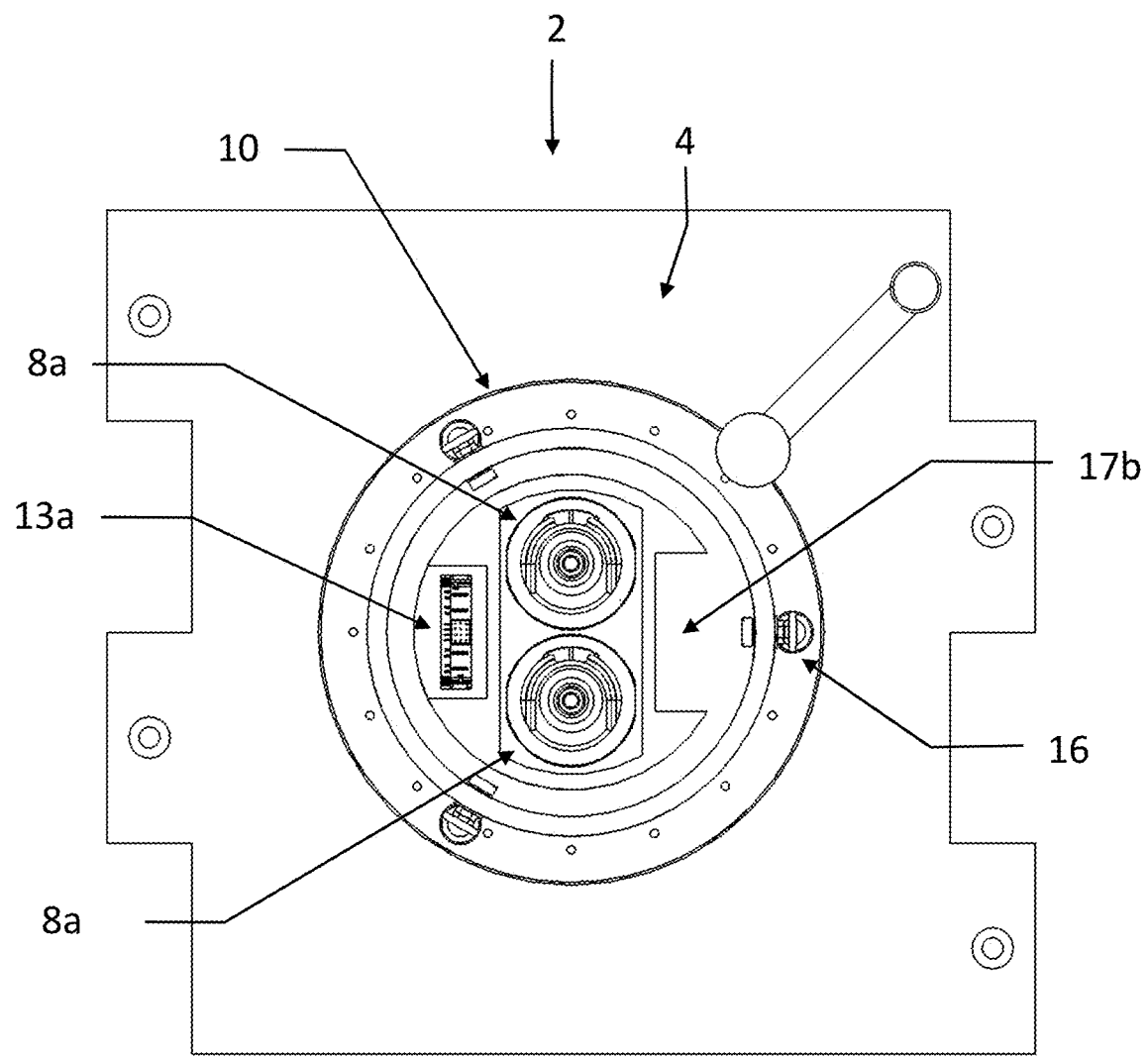
FIG. 10 is a front view of a docking plate 4 showing quick disconnect plumbing couplings 8a, alignment feature (key block) 14, and locking ring 10, with locking mechanism 12.

Any of the quick disconnect plumbing couplings 8*a* in the figures can also be shut-off couplings. For example, FIG. 9 is a back isometric view of a modular filter 3 showing quick disconnect plumbing couplings 8*a*, electrical connector (sink) 13*b* and alignment feature (key block) 14. Quick disconnect plumbing coupling 8*a* can be a shut-off coupling. Electrical connector (sink) 13*b* is designed to engage with an electrical connector source 13*a* in a docking plate (not shown) quickly and easily. FIG. 10 is a front view of a docking plate 4 showing quick disconnect plumbing couplings 8*a*, alignment feature (key block) 14, and locking ring 10 with cam follower 16, designed to engage a spiral groove 15 in the filter 3 (not shown). Quick disconnect plumbing coupling 8*a* can also be a shut-off coupling. Electrical connector (source) 13*a* is also designed to engage with an electrical connector source 13*b* in a modular filter (not shown) quickly and easily.

While there is no restriction on the orientation of the modular filter, a horizontal orientation can be convenient. Thus, in some embodiments, the longitudinal axis of the filtration module is horizontal or nearly horizontal. "Nearly horizontal", as used herein, refers to an orientation of 180±10°. A horizontal orientation is advantageous, because it lends itself to quick and easy replacement of modular filters by an operator.

In some embodiments, the filtration device is an electrochemical device for purifying an aqueous solution. The electrochemical device can be, for example, a deionization cell comprising a plurality of electrodes. The plurality of electrodes in the deionization cell are exposed to an input aqueous solution stream with an outlet for an output aqueous solution, or waste, stream. A short-circuit switch, a power supply, and a means for controlling the power supply are connected to the electrodes. Optionally, the deionization cell has a means for controlling the input stream and the output stream. Purifying is done by application of an electrical potential difference over two electrodes in the deionization cell. In some embodiments, a positive voltage is applied to anode electrodes and a negative voltage is applied to cathode electrodes, which results in migration and adsorption of negative ions on the anodes and simultaneous migration and adsorption of positive ions on the cathodes. The plurality of electrodes can be in a stacked or rolled configuration. In some embodiments of the filtration device, the plurality of electrodes is in a rolled configuration. In other embodiments of the filtration device, the plurality of electrodes is in a stacked configuration. Examples of deionization cells suitable for use in the modular filtration device are disclosed in U.S. Pat. No. 10,793,450, and Application Publication Nos. 2018/0334936 and 2020/0024158, all of which are incorporated by reference herein. The deionization cell can be, for example, at least one capacitive deionization (CDI) cell, membrane capacitive deionization (MCDI) cell, inverted capacitive deionization (i-CDI) cell, capacitive coagulation cell (CCC), electrodialysis reversal (EDR) cell, or faradic porosity cell (FPC). In some embodiments, the cell is a capacitive deionization (CDI) cell, an inverted capacitive deionization (i-CDI) cell, or a faradic porosity cell (FPC).

In some embodiments, the electrodes comprise a carbon electrode. The carbon electrode can comprise, for example, at least one of activated carbon, porous carbon, macroporous carbon, mesoporous carbon, microporous carbon, carbon xerogel, carbon aerogel, graphene, carbon nanofibers, carbon nanotubes, surface-modified carbon, silica-coated carbon, carbon block, carbon film, activated carbon film, carbon felt (nonwoven), or carbon cloth (woven). There are several methods for purification of water utilizing electric cells.

Figure 17:
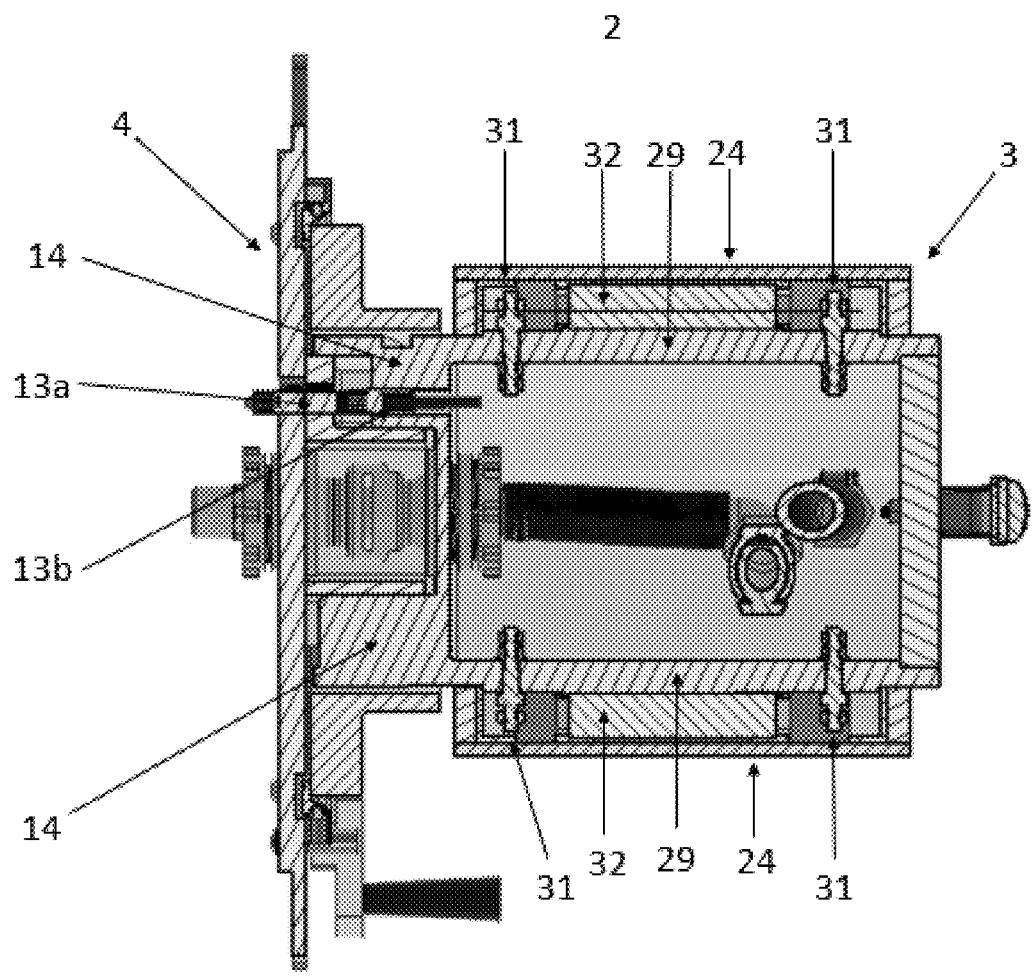
FIG. 17 is a bottom cross-sectional view of the modular filtration device 2 of FIG. 16, showing modular filter 3 docked with modular docking plate 10. Engaged electrical connectors 13a (source) and 13b (sink), and other features, are shown.
Figure 20:
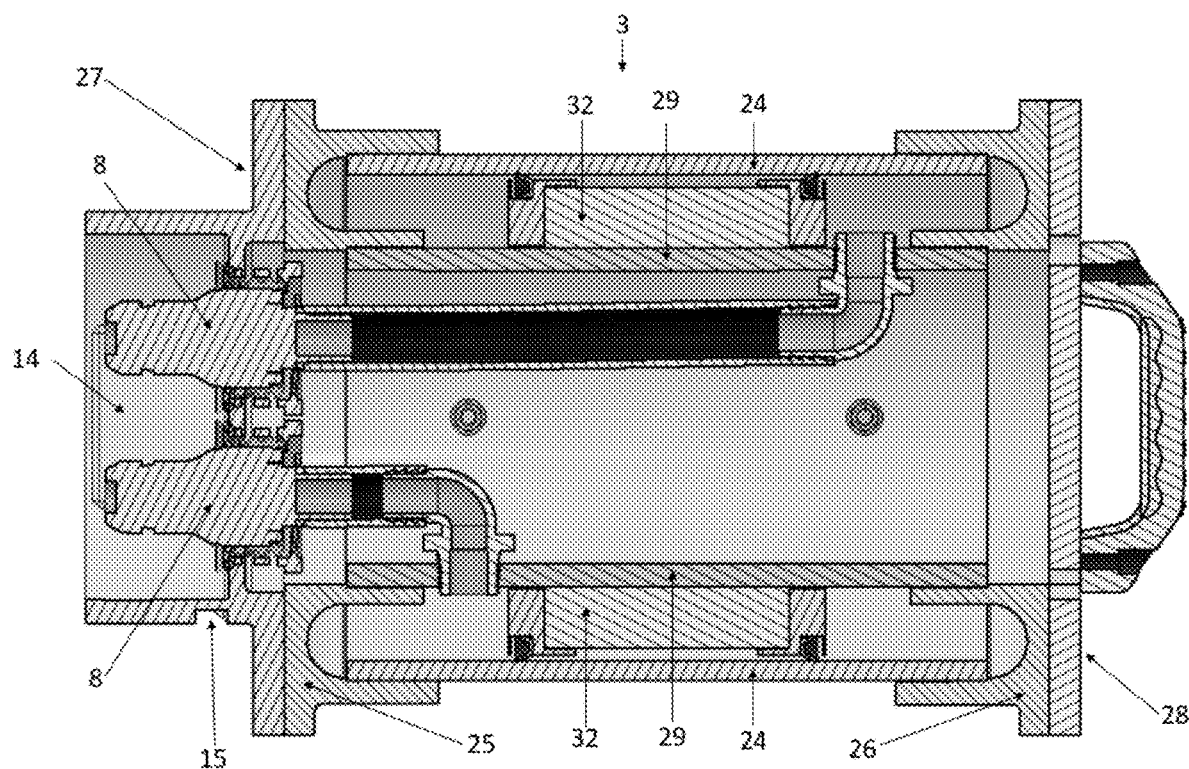
FIG. 20 is a side cross-sectional view of a modular filter 3, showing outer cylinder 24, inner cylinder 29, front cap 25, back cap 26, detachable docking face 28, and detachable hand plate 28.

In some embodiments, the modular filter comprises an outer hollow cylinder, an inner hollow cylinder, a front cap, and a back cap. The outer hollow cylinder, inner hollow cylinder, front cap, and back cap define a hollow, cylindrical, annular space for placement of the plurality of electrodes. Thus, in some embodiments, each of the plurality of electrodes is wrapped around an inner cylinder and encased by an outer cylinder, wherein the inner cylinder, the plurality of electrodes, and the outer cylinder are coaxial. This design is illustrated in FIGS. 16-17 and 20. FIG. 16 is a side cross-sectional view of a modular filtration device 2 showing modular filter 3 docked with modular docking plate 10. In this cross-sectional view, 29 is the inner cylinder, 24 is the outer cylinder, and the plurality of electrodes 32 is wrapped around the inner cylinder 24. Engaged shut-off couplings 19*a* (male) and 19*b* (female), and other features, are also shown. FIG. 17 is a bottom cross-sectional view of the modular filtration device 2 of FIG. 16, showing modular filter 3 docked with modular docking plate 10. Outer cylinder 24, inner cylinder 29, front cap 25, back cap 26, and a plurality of electrodes 32 wrapped around inner cylinder 29 are shown. Engaged electrical connectors 13*a* (source) and 13*b* (sink), and other features, are also shown. FIG. 20 is a side cross-sectional view of a modular filter 3, showing outer cylinder 24, inner cylinder 29, front cap 25, back cap 26, and detachable hand plate 28. In this cross-sectional view, 29 is the inner cylinder, 24 is the outer cylinder, and the plurality of electrodes 32 is wrapped around the inner cylinder 24. The flow of the aqueous solution through the plurality of electrodes is axial flow. The axial flow of the aqueous solution is in a direction for purifying the aqueous solution. For regeneration of the plurality of electrodes, the flow can be in the same direction as it was for purifying the aqueous solution or in the opposite direction as it was for purifying the aqueous solution.

Figure 11:
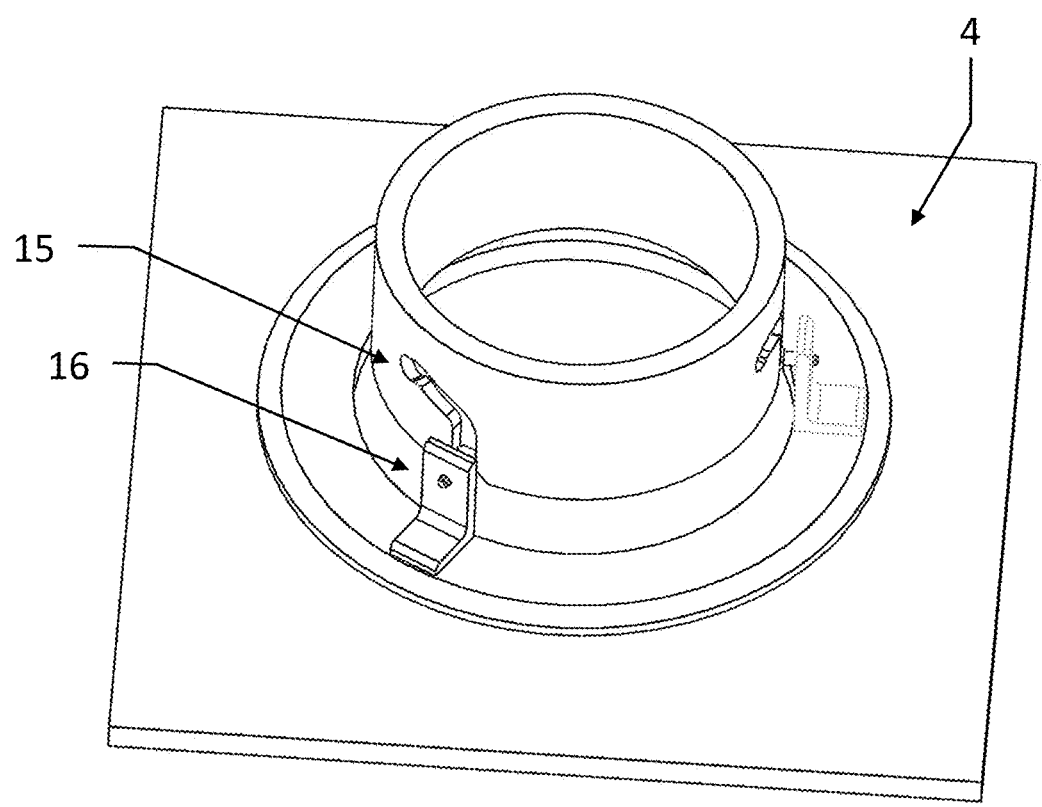
FIG. 11 is a top view of a modular docking plate 4 and a portion of a modular filter 3 showing spiral groove 15 in the modular filter 3 and cam follower (locking cam) 14 on the modular docking plate 4.
Figure 12:
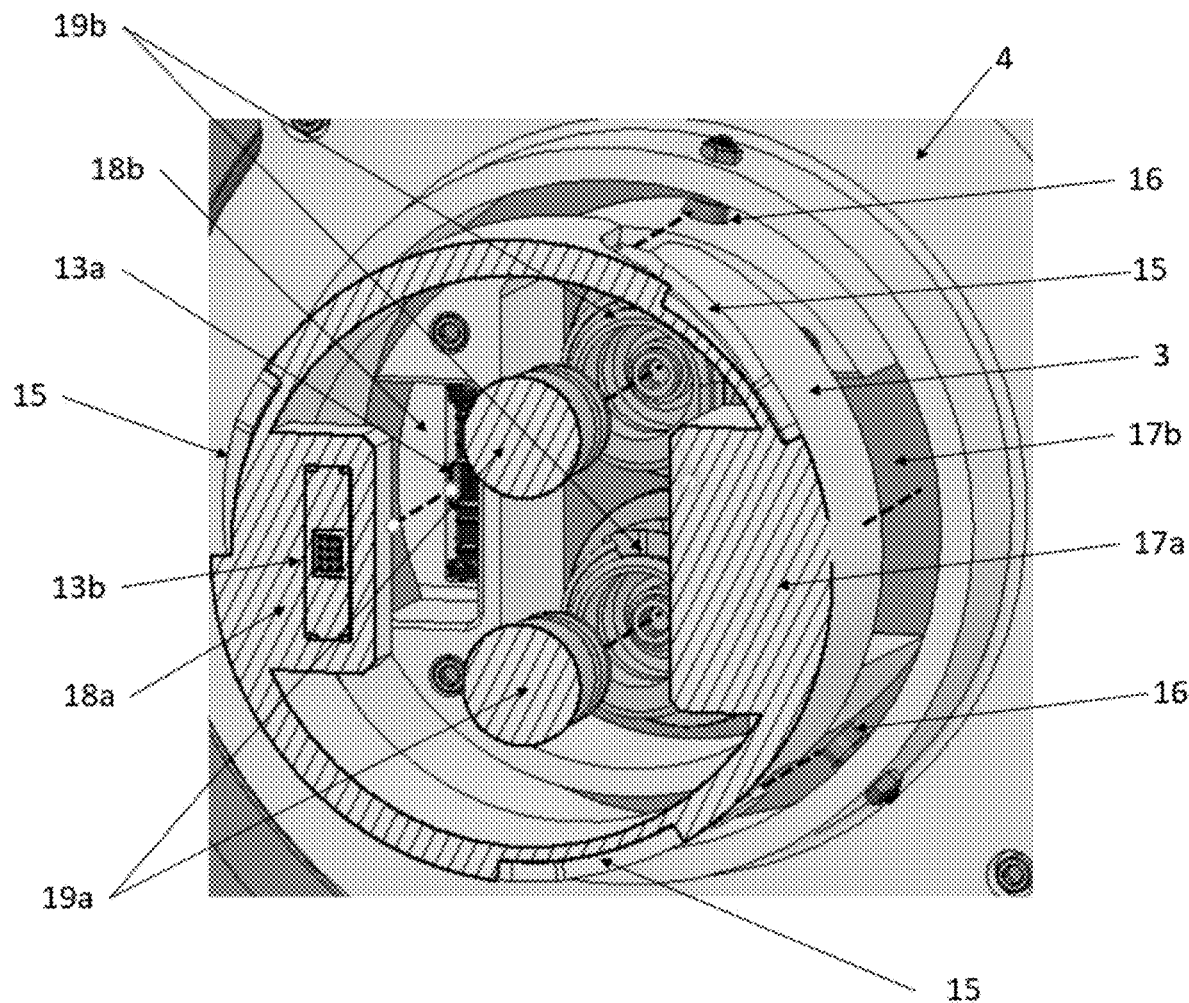
FIG. 12 is an enlarged front view of part of a modular docking plate 4 and a cross-section of a modular filter 3 aligned with the docking plate 4. This view shows male and female shut-off couplings 19a (male) and 19b (female), key blocks 17a (male) and 17b (female), and combination key blocks and electrical connectors 18a (male) and 18b (female).

The locking mechanism comprises a locking ring that is mounted on the modular docking plate, the locking ring rotates about a longitudinal axis aligned with the longitudinal axis of the modular filter and has at least one cam follower mounted on an inner surface of the locking ring, and the at least one cam follower engages with a spiral groove on the outer surface of the modular filter to lock the modular filter into place. An embodiment of the spiral groove is illustrated in FIGS. 11-12 and 18. FIG. 11 is a top view of a modular docking plate 4 and a portion of a modular filter 3 showing spiral groove 15 in the modular filter 3 and cam follower (locking cam) 14 on the modular docking plate 4. A second spiral groove and cam follower are also partly visible. FIG. 12 is an enlarged front view of part of a modular docking plate 4 and a cross-section of a modular filter 3 aligned with the docking plate 4. Three spiral grooves 15 and two cam followers 14 are also visible in FIG. 12. FIG. 18 is a front isometric view of a modular filter 3 showing outer cylinder 24, front cap 25, back cap 26, and spiral grooves 15. Male key block 17a, quick disconnect plumbing connectors 8a, and sink electrical connector 13b are also shown. A small seating bump can be added to the end of the spiral grooves 15 to provide the at least one cam follower a location to sit and lock into place.

A locking ring handle is mounted on the locking ring to facilitate rotation of the locking ring once the at least one cam follower is aligned with the at least one spiral groove of the modular filter. The modular filter is mounted to the modular docking plate using a linear engagement motion along the longitudinal axis of the filter, which engages the at least one alignment feature first, followed by rotation of the locking ring pulling the filter and its electrical and plumbing connections into fully engaged and seated positions. The locking ring is rotated until the at least one cam follower pulls the filter into its fully engaged and seated position by fully engaging with the at least one spiral groove of the modular filter. The modular filter is dismounted from the modular locking plate by reversing mounting. In particular, the modular filter is dismounted from the modular docking plate by rotation of the locking ring in the opposite direction, which disengages and unseats the filter and electrical and plumbing connections, followed by a linear disengagement motion along the longitudinal axis to remove the filter. Rotation of the locking ring is facilitated by a slewing ring (turntable bearing). A top view of a slewing ring 22 is shown in FIG. 15 and a cross-sectional view of a slewing ring 22 is shown in FIG. 16.

Figure 15A:
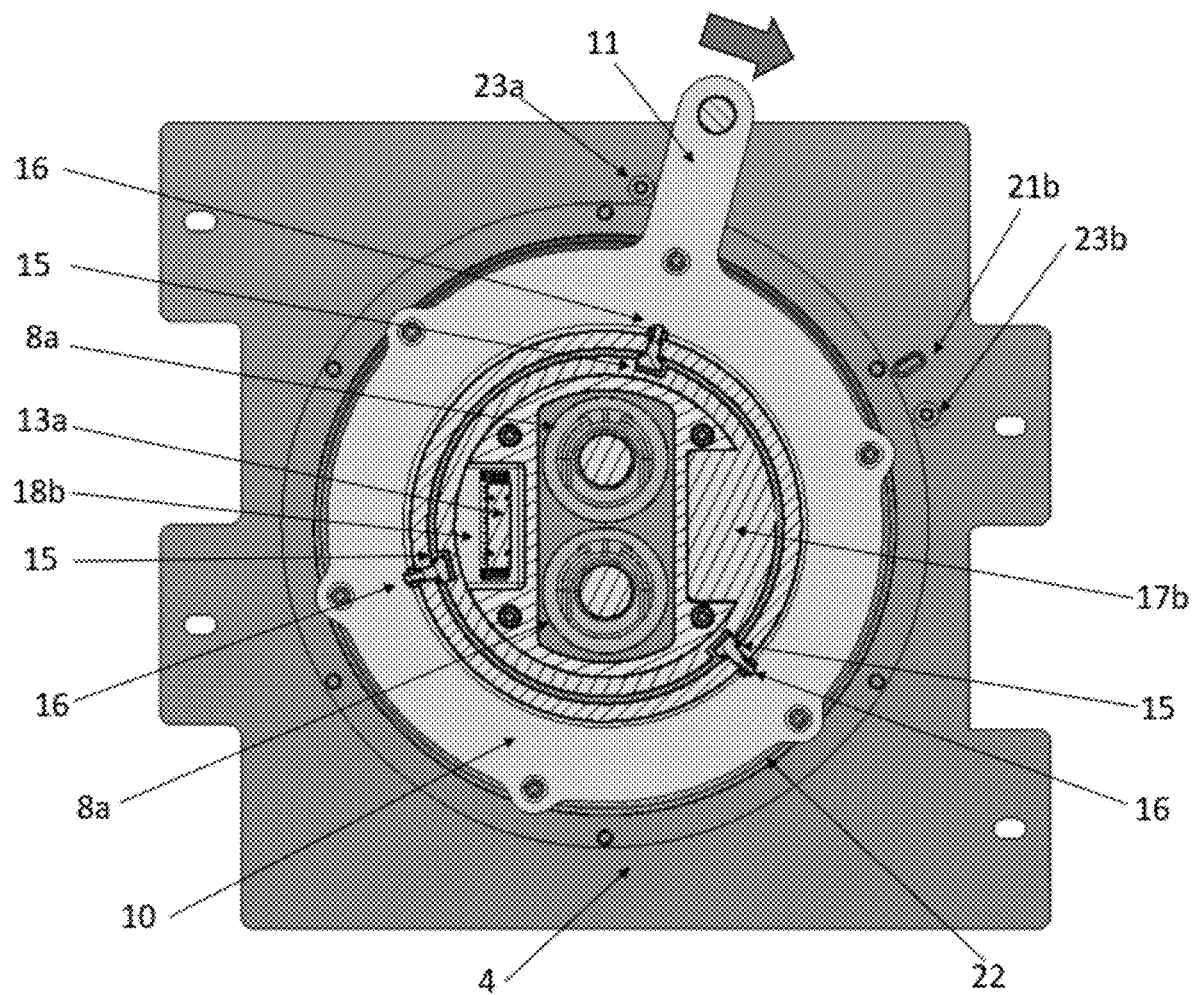
FIG. 15A to 15E are top views of a modular docking plate 4 which together illustrate the locking and unlocking mechanism of the locking ring 10. The figures show an open position (FIG. 15A), a partially locked position (FIG. 15B), the locked position (FIG. 15C), a partially locked position (FIG. 15D), and a fully locked position (FIG. 15E).
Figure 15B:
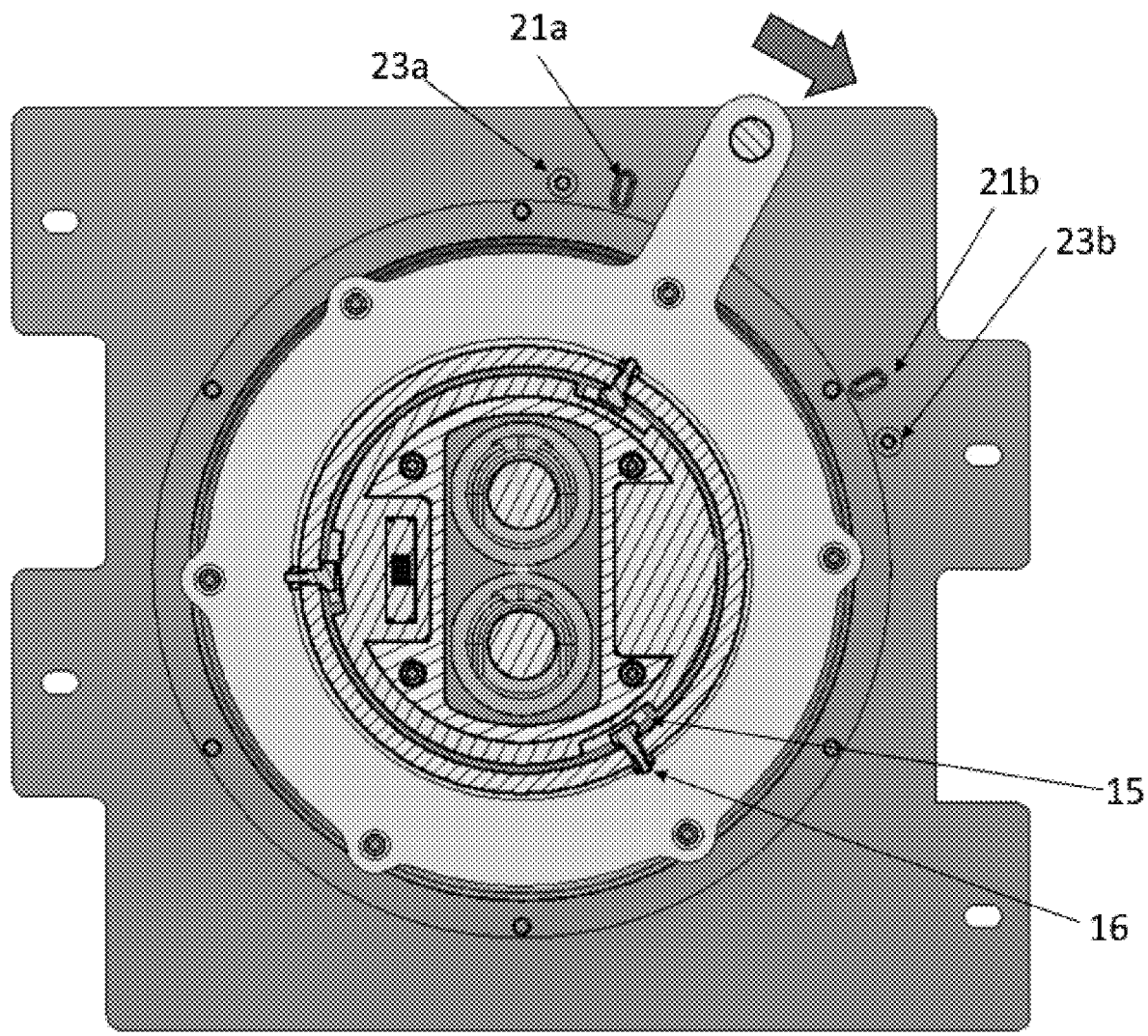
Figure 15C:
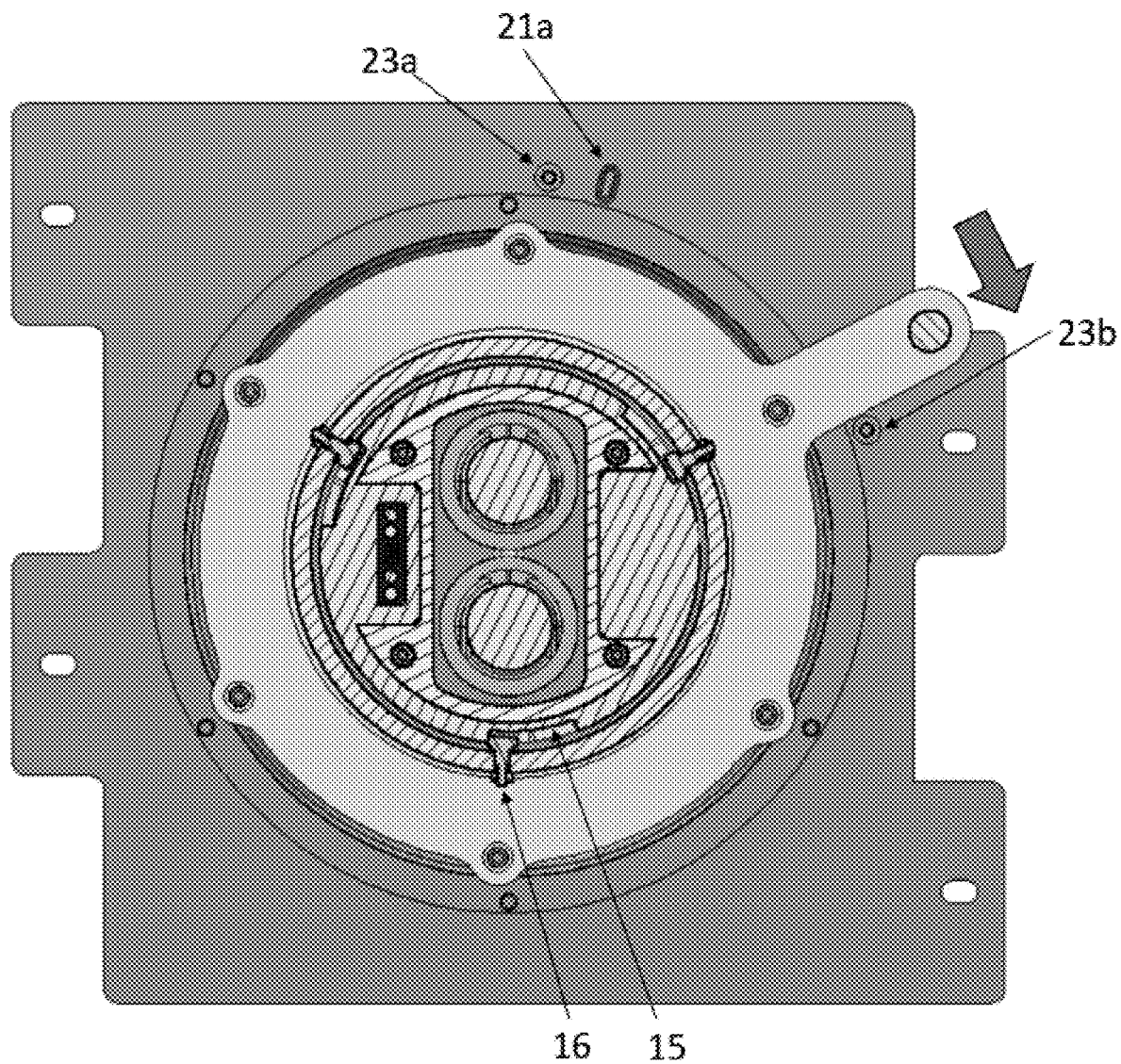
Figure 15D:
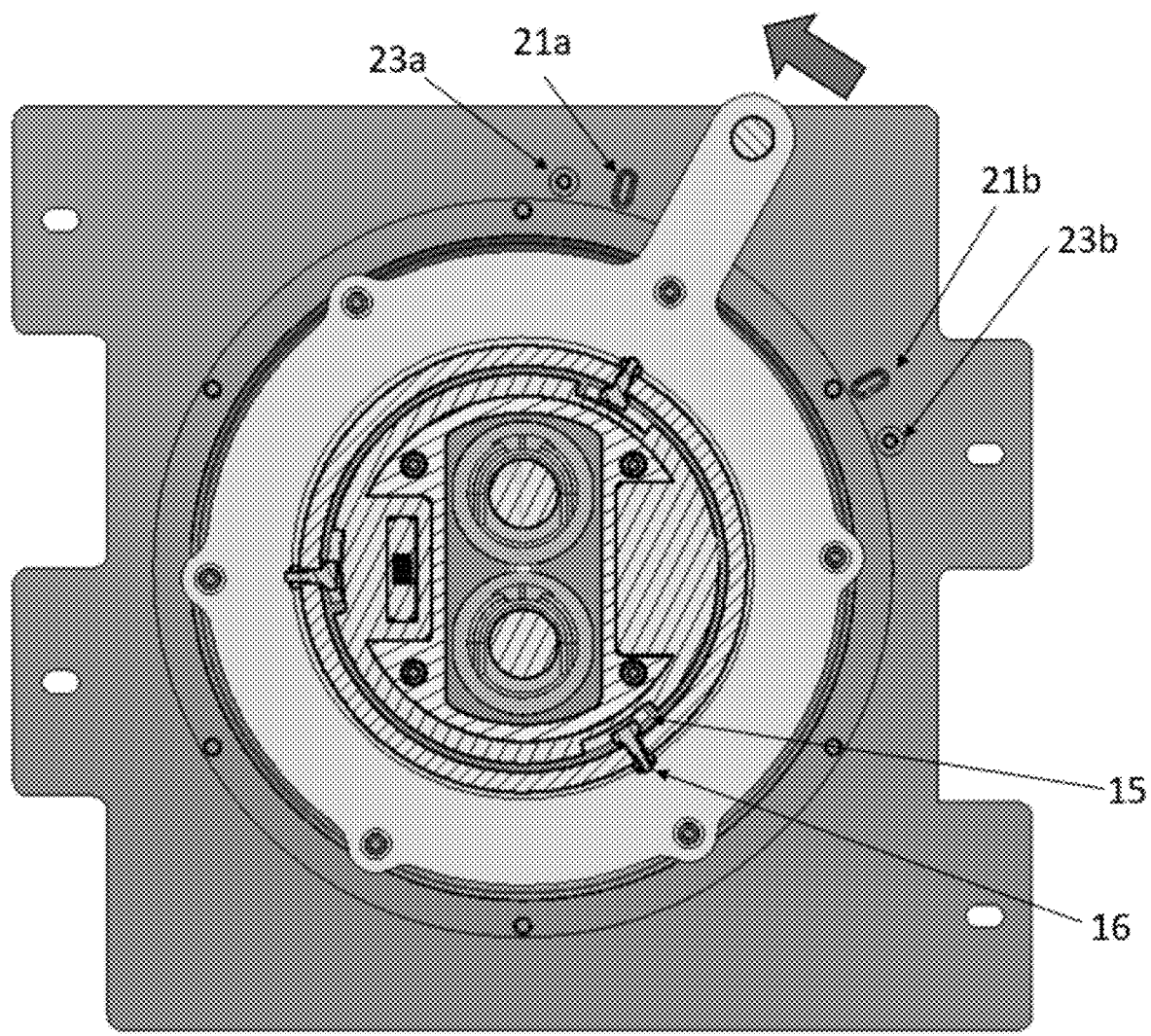
Figure 15E:
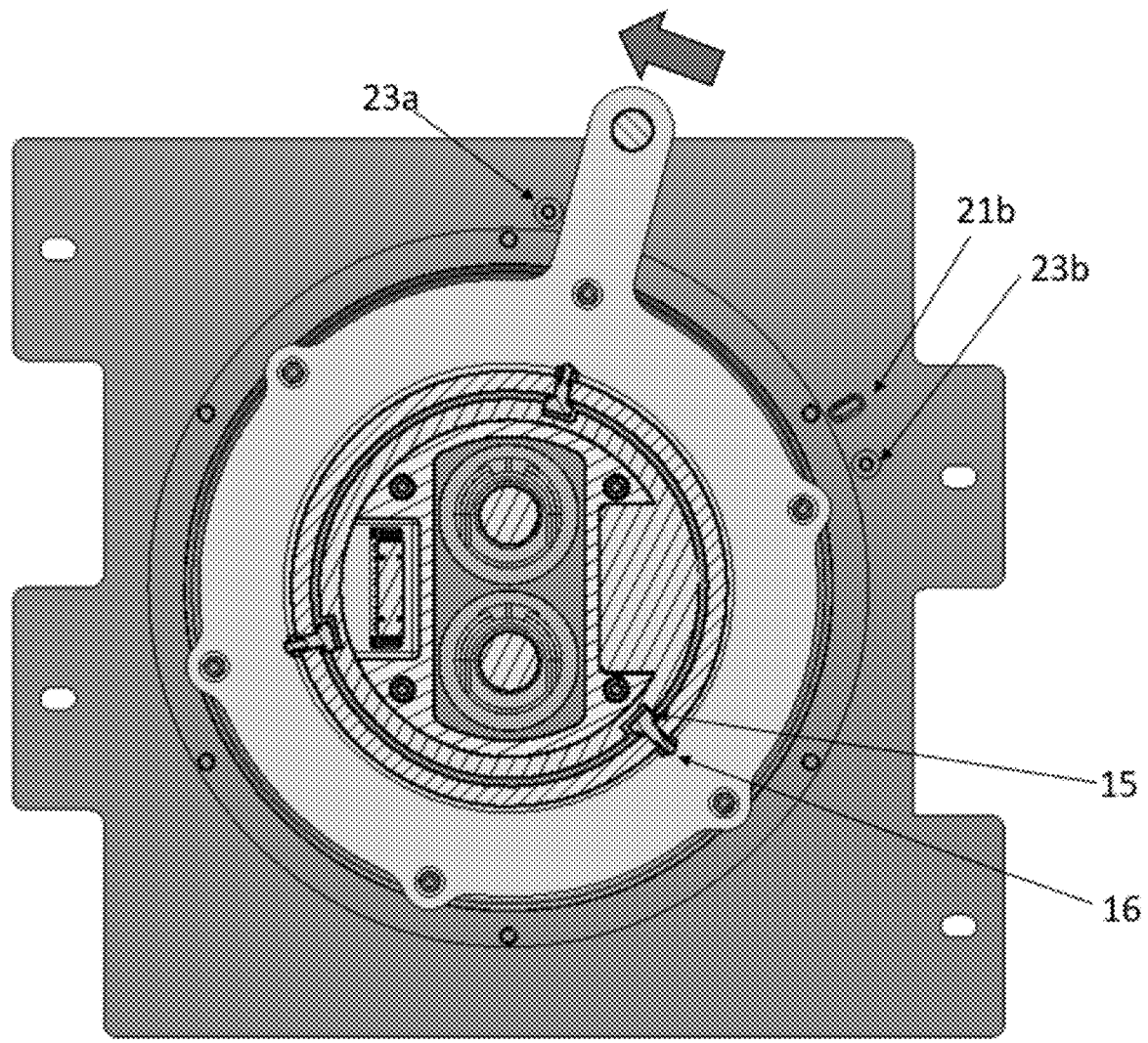

The locking and unlocking mechanism of the locking ring and the mounting and dismounting of the modular filter are illustrated by FIG. 15A to 15E, which are top views of the modular docking plate 4. The figures show an unlocked position (FIG. 15A), a partially locked position (FIG. 15B), a locked position (FIG. 15C), a partially unlocked position (FIG. 15D), and the unlocked position again (FIG. 15E). FIG. 15A is the unlocked position. The position is fixed by a locking ring handle stop in unlocked position 23a and a ball detent (not visible) comprising a ball and a detent (locking cavity). In this unlocked position, the ball under the locking ring 10 is engaged with the detent in the modular docking plate 4. Cam followers (locking cams) 16 are paired and partially engaged with spiral grooves 15 in the modular filter (partial cross-sectional view of spiral grooves 15). In this embodiment, there are three cam followers 15 paired and partially engaged with three spiral grooves 16. More or less paired cam followers and spiral grooves can be used. Detent in locked position 21b, and locking ring handle stop in locked position 23b are also shown on docking plate 4. To lock the modular filter, the locking ring is rotated clock-wise as indicated by the arrow.

FIG. 15B indicates a partially locked position. The locking ring 10 has been rotated clockwise slightly away from locking ring handle stop 23a, and the ball has disengaged from the unlocked position detent 21a, which is now visible on locking ring 10. The locking cam 16 has followed the path of spiral groove 15 thereby partially engaging. The electrical connectors and quick disconnect plumbing connectors are also partially engaged.

FIG. 15C indicates a fully locked position. Locking ring 10 has been rotated away from locking ring handle stop 23a and now abuts locking ring handle stop 23b. The ball has engaged with locked position detent 21b (not visible). The locking cam 16 has followed the path of spiral groove 15 to the end, thereby fully engaging. The electrical connectors and quick disconnect plumbing connectors are also fully engaged.

FIG. 15D indicates a partially unlocked position. The locking ring 10 has been rotated counter-clockwise away from locking ring handle stop 23b, and the ball has disengaged from the locked position detent 21b, which is now visible on locking ring 10. The locking cam 16 has followed the path of spiral groove 15 in the opposite direction, thereby partially disengaging. The electrical connectors and quick disconnect plumbing connectors are also partially disengaged.

FIG. 15E indicates the fully unlocked position again. Locking ring 10 has been rotated counter-clockwise away from locking ring handle stop 23b and now abuts locking ring handle stop 23a. The ball has engaged with unlocked position detent 21a (not visible). The locking cam 16 has followed the path of spiral groove 15 to the end, thereby fully disengaging. The electrical connectors and quick disconnect plumbing connectors are also fully disengaged. The filter is ready to be removed. Other features common to FIG. 15A to 15E, but not identified above, are quick disconnect plumbing couplings 8a, key block 14, source electrical connector 13a, and slewing (turn table) ring 22. These parts are labelled in FIG. 15A.

Figure 13:
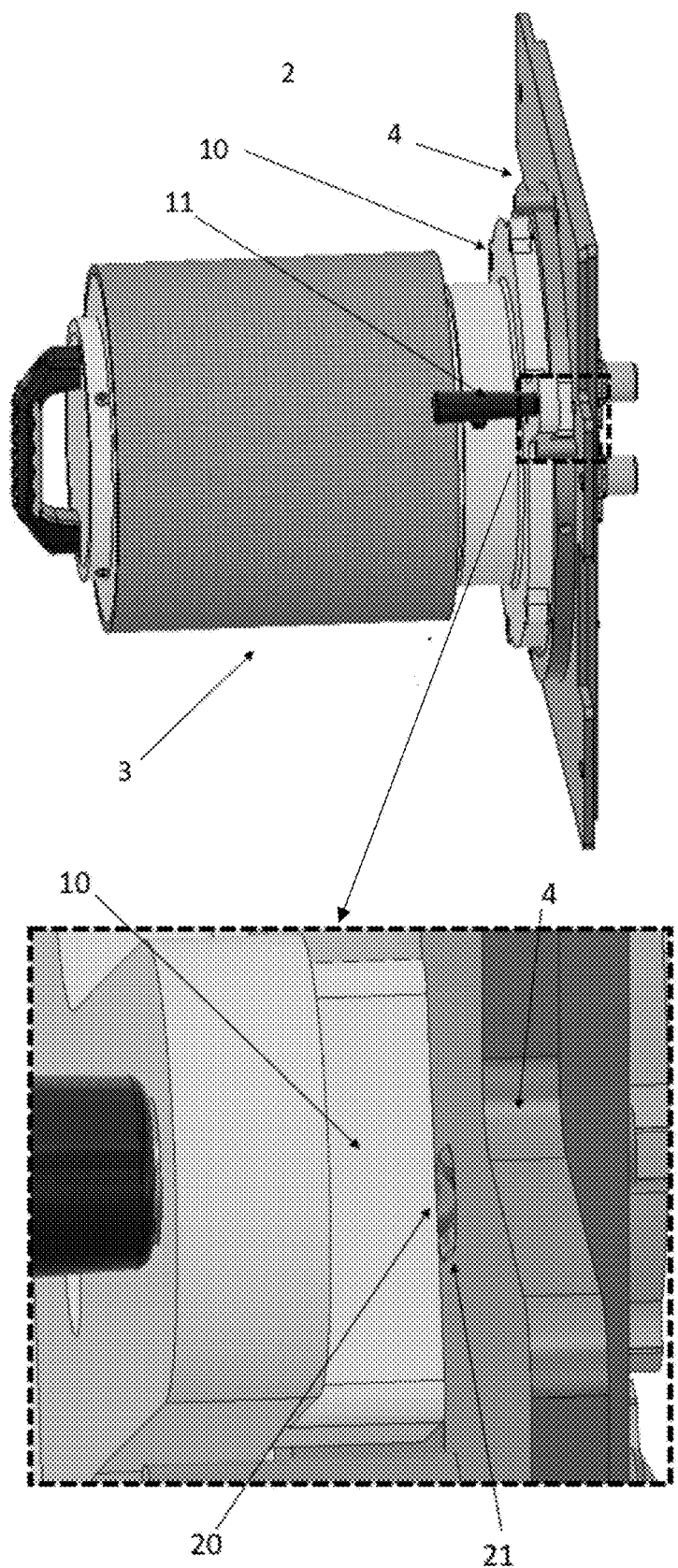
FIG. 13 is a side view of a modular filtration device 2, with locking ring 10 in the locked position and with an enlarged view of a portion of the modular docking plate 4, locking ring 10, the ball 20 of the ball detent, and detent (locking cavity) 21 of the ball detent. The enlarged view shows the ball detent 20 engaged in the locking cavity 21.
Figure 14:
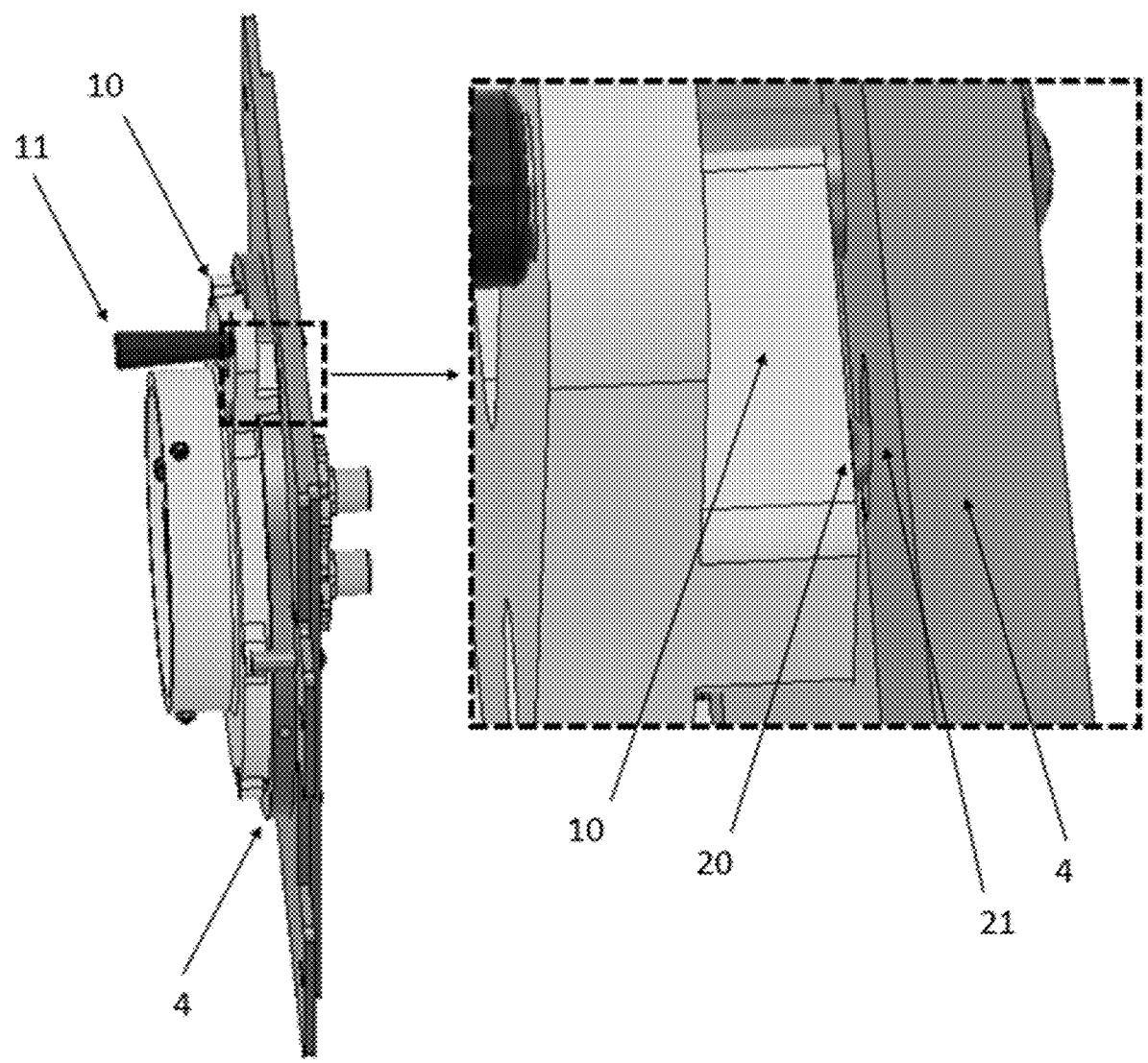
FIG. 14 is a side view of a modular docking plate 4, with locking ring 10 in the unlocked position and with an enlarged view of a portion of the modular docking plate 4, locking ring 10, ball detent 20, and locking cavity 21. The enlarged view shows the ball 20 engaged in the detent 21.

The filtration device further comprises a ball detent, comprising a spring-actuated ball positioned on the locking ring to engage with a detent on the modular docking plate when the at least one cam follower is fully engaged with the at least one spiral groove so as to lock the modular filter into place. The top of the ball detent 12, showing the spring, is illustrated in FIG. 4. The ball engages with a detent in both the locked and unlocked position, as illustrated in FIG. 15A to 15E and as described above. FIG. 13 is a side view of a modular filtration device 2, with locking ring 10 in the locked position and with an enlarged view of a portion of the modular docking plate 4, locking ring 10, the ball 20 of the ball detent, and detent (locking cavity) 21 of the ball detent. The enlarged view shows the ball 20 engaged in the locking cavity 21. FIG. 14 is a side view of a modular docking plate 4, with locking ring 10 in the unlocked position and with an enlarged view of a portion of the modular docking plate 4, locking ring 10, ball detent 20, and locking cavity 21. The enlarged view shows the ball 20 engaged in the detent 21.

Figure 21A:
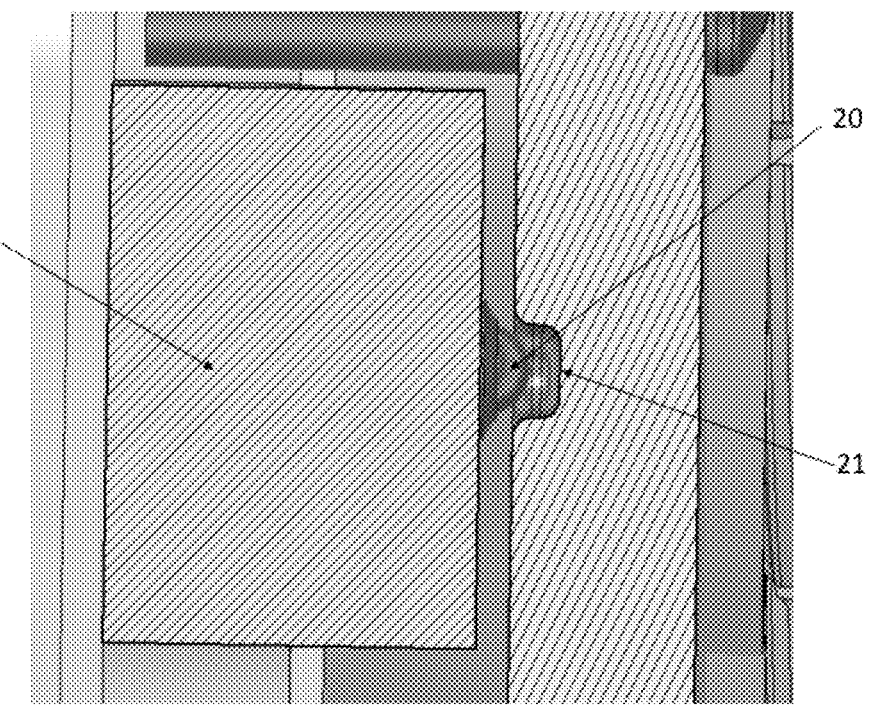
FIGS. 21A and 21B are cross-sectional views of the ball detent, showing a portion of locking ring 10, ball 20 of the ball detent, and detent (locking cavity) 21 of the ball detent.
Figure 21B:
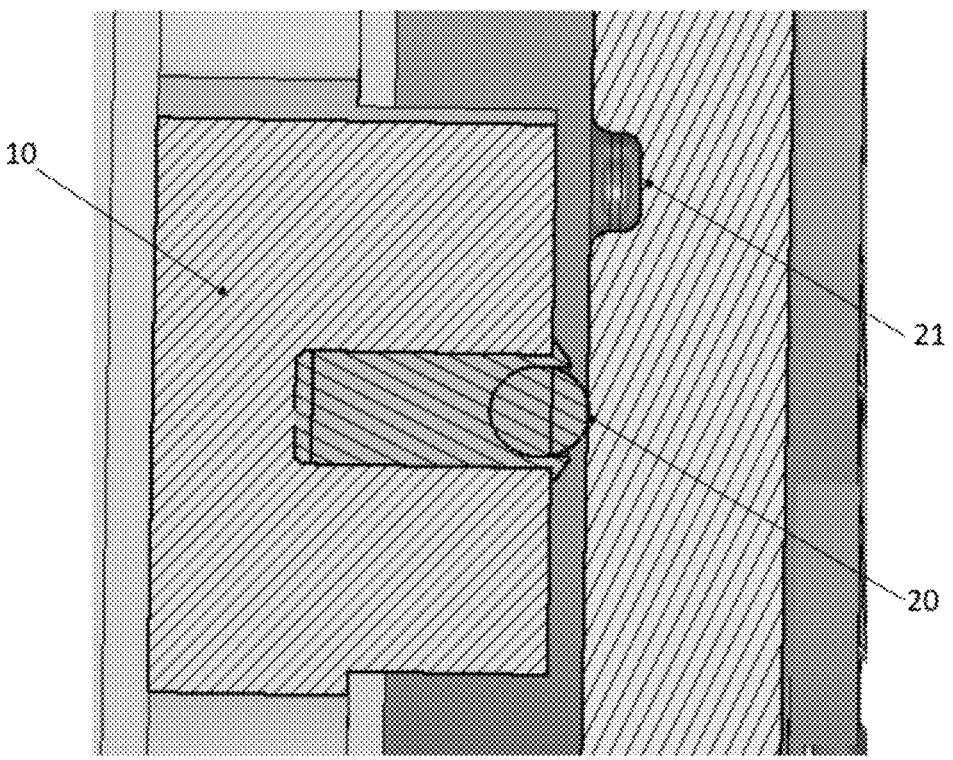

The ball detent is further illustrated by FIGS. 21A and 21B. FIGS. 21A and 21B are cross-sectional views of the ball detent, showing a portion of locking ring 10, ball 20 of the ball detent, and detent (locking cavity) 21 of the ball detent. FIG. 21A shows the engaged position, with ball 20 engaged with locking cavity 21, while FIG. 21B shows the disengaged position, with ball 20 disengaged from locking cavity 21. In the disengaged position illustrated in FIG. 21B, the ball rides on the near surface of the modular docking plate. Ball 20 and locking cavity 21 are positioned so that the ball engages with the locking cavity at a desired relative orientation of the locking ring and near surface of the modular locking plate as illustrated by FIG. 21A. Engagement of the ball 20 with locking cavity 21 is implemented by a spring or other mechanical means in the ball detent.

The modular filter has at least one alignment feature that mates with an alignment feature on the modular docking plate to provide proper alignment of the filter with the docking plate. One of the advantages of the present filtration devices is that the modular filter is designed to dock with the modular docking plate in a unique relative orientation. The unique orientation is designed so that the male and female shut-off couplings in the filter and docking plate, and the source and sink electrical connectors in the filter and docking plate, fully engage. To achieve the unique relative orientation, the modular docking plate and the modular filter each have at least one complementary alignment feature which mate in a lock-and-key fashion. In some embodiments, the at least one alignment feature of the modular filter is a male key block and the mating feature of the modular docking plate is a female key block. An illustration of a male key block 17a of the modular filter is provided in FIG. 9 and an illustration of a complementary female key block 17b is provided in FIG. 10. Male key block 17a and complementary female key block 17b are designed to provide a unique orientation of the modular filter to ensure engagement and seating of complementary quick disconnect plumbing connectors 8a and complementary electrical connectors 13a (source) and 13b (sink) in FIGS. 9 and 10. Another illustration of a complementary key blocks is FIG. 12. FIG. 12 is an enlarged front view of part of a modular docking plate 4 and a cross-section of a modular filter 3 aligned with the docking plate 4. This view shows male and female shut-off couplings 19a (male) and 19b (female), key blocks 17a (male) and 17b (female), and combination key blocks and electrical connectors 18a (male) and 18b (female). In FIG. 12, male key block 17a of the filter module mates with female key block 17b of the modular docking plate. A male key block 17a is also illustrated in FIG. 18 and a female key block 17b is also illustrated in FIG. 15A. In FIGS. 10, 12, 15A, and 18, male key block 17a is on the modular filter while complementary female key block 17b is on the docking plate. However, in other embodiments, the male key block can be on the modular docking plate, and the female key block can be on the modular filter.

In some embodiments, the alignment feature can have a dual function. For example, the alignment feature can be a key block having an electrical connector. In FIG. 12, 18a is combination male key block and electrical connector (sink) 13b, which is designed for mating with 18b, a combination male key block and electrical connector (source) 13a. In FIG. 15A, 18b is combination female key block and electrical connector (source) 13a, which is designed for mating with a combination male key block and electrical connector (sink). 17b is a female key block without an electrical connector, designed for mating with a male key block without an electrical connector.

In some embodiments, the docking face is detachable. In some embodiments, the modular filter further comprises a detachable handle plate comprising a handle opposite the docking face. Detachable docking face 27 and detachable handle plate 28 are illustrated in FIG. 18-19, which are back and front isometric views, respectively, and FIG. 20, which is a side cross-sectional view, of filtration devices 3.

The outer hollow cylinder, inner hollow cylinder, front cap, detachable docking face, back cap, and detachable handle plate are collectively referred to as the modular filter housing. The housing can be made of a variety of materials, for example thermoplastic or thermoset materials. The thermoplastic or thermoset material should have chemical resistance, e.g. resistance to acidic and basic aqueous solutions. Examples of suitable materials include HDPE, polypropylene, EPDM, polyurethane, polyvinyl chloride (PVC), and fiberglass. In some embodiments, the outer hollow cylinder, inner hollow cylinder, front cap, detachable docking face, back cap, and detachable handle plate are all made of polyvinyl chloride (PVC).

Figure 1:
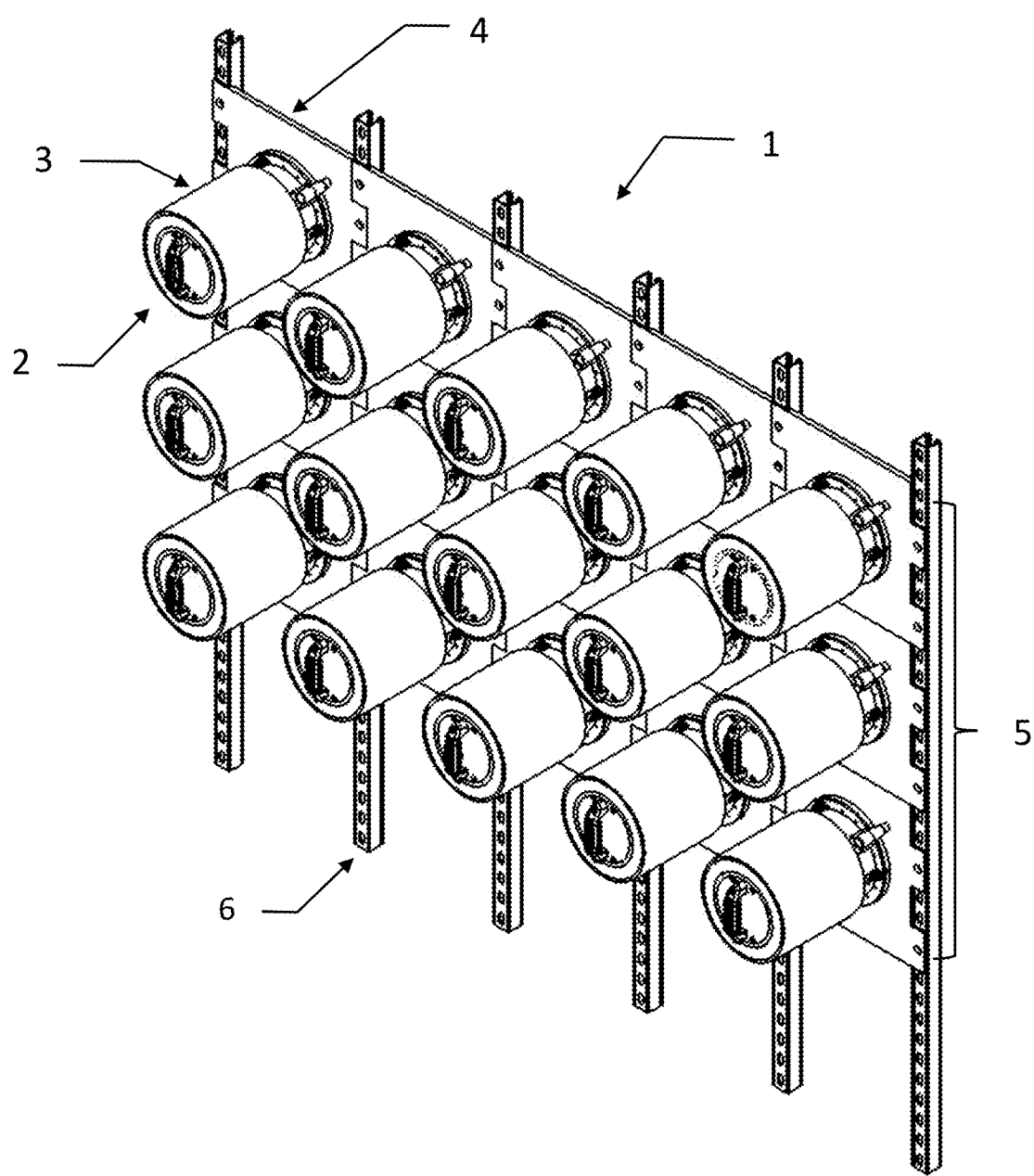
FIG. 1 is a front isometric view of the modular filtration system 1 showing an interleaved array of filtration devices 2 mounted on structural elements 6.
Figure 5:
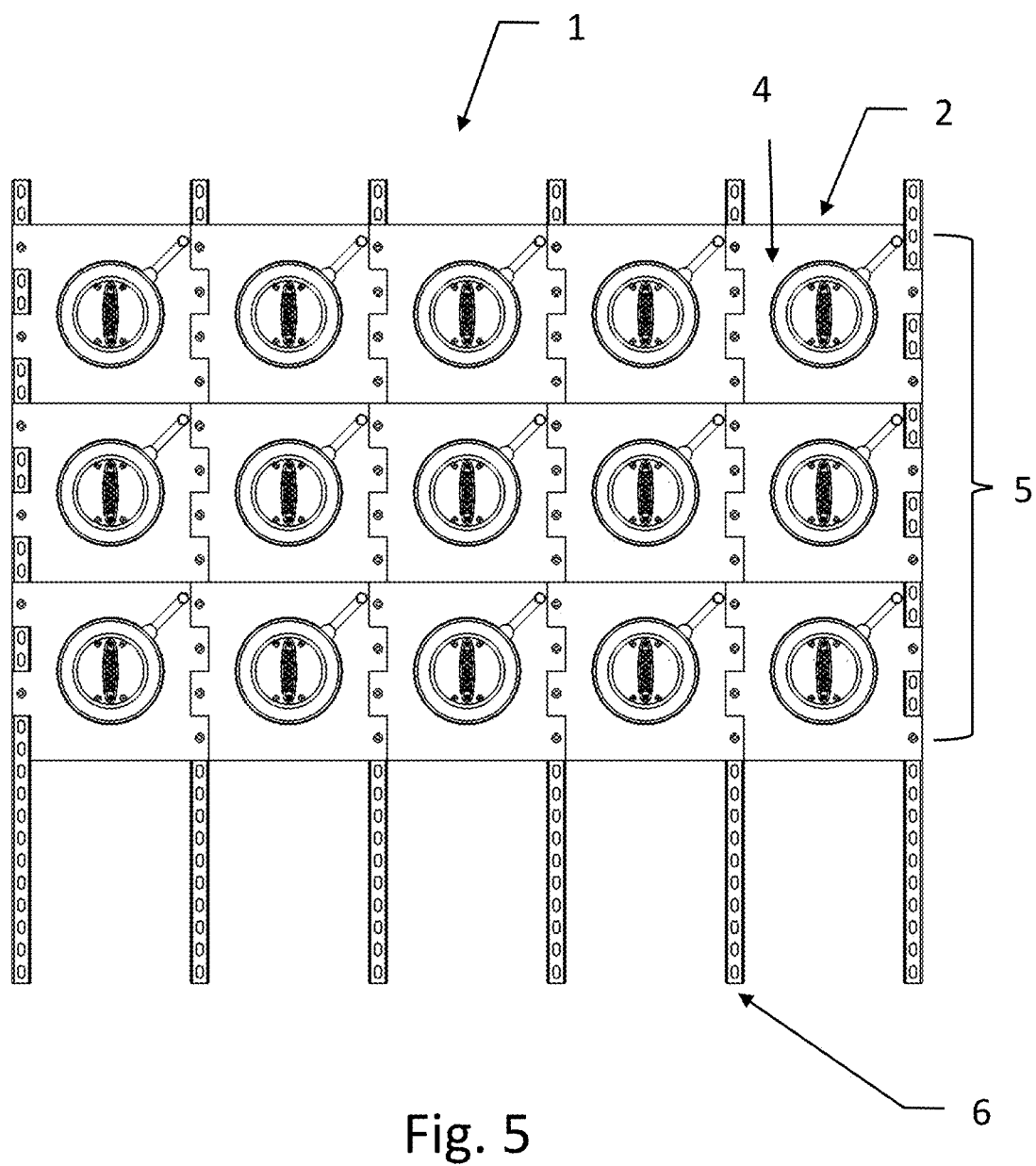
FIG. 5 is a front view of modular filtration system 1 showing an interleaved array of filtration devices 2 mounted on structural elements 6.
Figure 6:
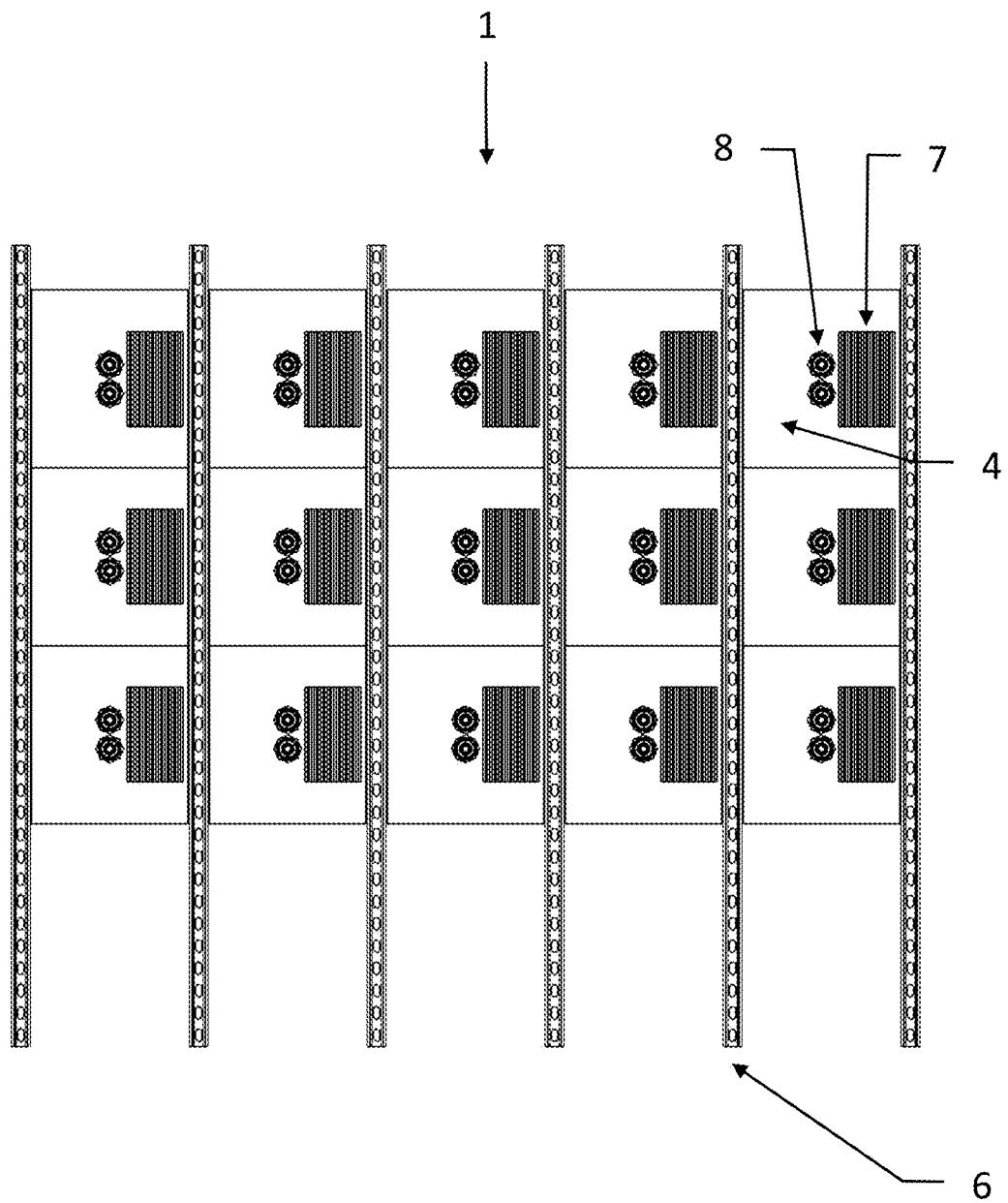
FIG. 6 is a back view of the modular filtration system 1 showing an array of filtration devices mounted on structural elements 6, showing the back of docking plates 4, power supply 7 and back plumbing connectors 8.

Advantageously, a plurality of the filtration devices are can be mounted in close proximity. Thus, a modular filtration system comprises a plurality of the filtration devices. The plurality of filtration devices can be mounted in a tile-like fashion on structural elements. The structural element can be, for example, a unistrut or a tubular frame. Modular filtration systems are illustrated in FIGS. 1-2 and 5-6. FIG. 1 is a front isometric view of the modular filtration system 1 showing an interleaved array of filtration devices 2 mounted on structural elements 6. FIG. 2 is a back isometric view of the modular filtration system 1 showing an array of filtration devices mounted on structural elements 6. The backs of docking plates 4, power supply 7 and back plumbing connectors 8 are visible. FIG. 5 is a front view of modular filtration system 1 showing an interleaved array of filtration devices 2 mounted on structural elements 6. FIG. 6 is a back view of the modular filtration system 1 showing an array of modular filtration devices. The backs of the docking plates 4, power supply 7, and back plumbing connectors 8 are visible.

In some embodiments, the modular docking plate comprises interleaving features to allow a plurality of docking plates to be mounted on a structural element in close proximity to other docking plates. Thus, in some embodiments, the plurality of filtration devices are interleaved. Exemplary interleaving features 5 are illustrated in FIGS. 4-5 and 7-8. FIG. 7 is a back isometric view of a single modular filtration device 2 showing modular docking plate 4 with interleaving features 5, and modular filter 3. FIG. 8 a front isometric view of a modular filtration device 2 showing modular docking plate 4 with interleaving features 5, locking ring 10, and modular filter 3. FIG. 4 is a front isometric view of the modular filtration device 2 showing modular docking plate 4 and an installed modular filter 3, with interleaving features 5, locking ring 10, and locking mechanism 12. The filtration device is mounted on structural element 6, and meshing of the interleaving features with other mounted filtration devices is shown. The interleaving (meshing) of a plurality of filtration devices comprising interleaving features 5 is illustrated in FIG. 5.

At the interleaving location, mounting holes are provided to allow the docking plate to be mounted to the structural elements. This design advantageously minimizes the volume required to create a modular filter system of any given flow capacity comprising a plurality of modular filtration devices. It also allows the designer flexibility to tile the plates in whatever configuration fits the needs of the installation space, i.e. tall and narrow or short and wide.

This disclosure is further illustrated by the following embodiments, which are not intended to limit the claims.

Embodiment 1. A modular filtration device comprising: a modular docking plate comprising: at least one quick disconnect plumbing coupling; at least one electrical connector; at least one alignment feature for aligning and receiving a modular filter; optionally, a mounting feature for a power supply that provides power to the filter; and a modular filter comprising a docking face comprising: at least one quick disconnect plumbing coupling; at least one electrical connector; and at least one alignment feature that mates with an alignment feature of the modular docking plate to provide proper alignment of the filter with the docking plate, engagement of the quick disconnect plumbing couplings of the docking plate and the filter, engagement of the electrical connectors of the docking plate and the filter, and engagement of the locking mechanism; wherein the modular filtration device comprises a locking mechanism to hold the filter in place during operation.

Embodiment 2. The filtration device of embodiment 1, wherein the filtration device is an electrochemical device for purifying an aqueous solution.

Embodiment 3. The filtration device of embodiment 2, wherein the filtration device comprises a deionization cell comprising a plurality of electrodes.

Embodiment 4. The filtration device of embodiment 3, wherein the plurality of electrodes comprises a carbon electrode.

Embodiment 5. The filtration device of embodiment 4, wherein the carbon electrodes comprise at least one of activated carbon, porous carbon, macroporous carbon, mesoporous carbon, microporous carbon, carbon xerogel, carbon aerogel, graphene, carbon nanofibers, carbon nanotubes, surface-modified carbon, silica-coated carbon, carbon block, carbon film, activated carbon film, carbon felt, or carbon cloth.

Embodiment 6. The filtration device of any of embodiments 3 to 5, wherein the deionization cell is a capacitive deionization (CDI) cell, membrane capacitive deionization (MCDI) cell, inverted capacitive deionization (i-CDI) cell, capacitive coagulation cell (CCC), electrodialysis reversal (EDR) cell, or faradic porosity cell (FPC).

Embodiment 7. The filtration device of embodiment 6, wherein the deionization cell is a capacitive deionization (CDI) cell, an inverted capacitive deionization cell (i-CDI), or faradic porosity cell (FPC).

Embodiment 8. The filtration device of any of embodiments 3 to 7, wherein each of the plurality of electrodes is wrapped around an inner cylinder and encased by an outer cylinder, wherein the inner cylinder, the plurality of electrodes, and the outer cylinder are coaxial.

Embodiment 9. The filtration device of any of embodiments 1 to 8, wherein the locking mechanism comprises a locking ring that is mounted on the modular docking plate, the locking ring rotates about a longitudinal axis aligned with the longitudinal axis of the modular filter and has at least one cam follower mounted on an inner surface of the locking ring, and the at least one cam follower engages with a spiral groove on the outer surface of the modular filter to lock the modular filter into place.

Embodiment 10. The filtration device of embodiment 9, wherein the modular filter is mounted to the modular docking plate using a linear engagement motion along the longitudinal axis of the filter, which engages the at least one alignment feature first, followed by rotation of the locking ring pulling the filter and its electrical and plumbing connections into fully engaged and seated positions.

Embodiment 11. The filtration device of embodiment 10, wherein the locking ring is rotated until the at least one cam follower pulls the filter into its fully engaged and seated position by fully engaging with the at least one spiral groove of the modular filter.

Embodiment 12. The filtration device of embodiment 10 or 11, wherein the modular filter is dismounted from the modular docking plate by reversing mounting.

Embodiment 13. The filtration device of embodiment 10 or 11, wherein the modular filter is dismounted from the modular docking plate by rotation of the locking ring in the opposite direction, which disengages and unseats the filter and electrical and plumbing connections, followed by a linear disengagement motion along the longitudinal axis to remove the filter.

Embodiment 14. The filtration device of any of embodiments 1 to 13, wherein the modular filter comprises a handle to facilitate handling of the filter during mounting and dismounting.

Embodiment 15. The filtration device of any of embodiments 9 to 14, wherein a locking ring handle is mounted on the locking ring to facilitate rotation of the locking ring once the at least one cam follower is aligned with the at least one spiral groove of the modular filter.

Embodiment 16. The filtration device of any of embodiments 9 to 15, wherein the filtration device further comprises a ball detent, comprising a spring-actuated ball positioned on the locking ring to engage with a detent on the modular docking plate when the at least one cam follower is fully engaged with the at least one spiral groove so as to lock the modular filter into place.

Embodiment 17. The filtration device of any of embodiments 3 to 16, in which the flow of the aqueous solution through the plurality of electrodes is axial flow.

Embodiment 18. The filtration device of any of embodiments 1 to 17, wherein the longitudinal axis of the filtration module is horizontal or nearly horizontal.

Embodiment 19. The filtration device of any of embodiments 1 to 18, wherein the at least one alignment feature of the modular filter is a male key block and the alignment feature of the modular docking plate is a female key block.

Embodiment 20. The filtration device of any of embodiments 1 to 19, wherein the modular filter comprises an outer hollow cylinder, an inner hollow cylinder, a front cap, and a back cap.

Embodiment 21. The filtration device of any of embodiments 1 to 20, wherein the docking face is detachable.

Embodiment 22. The filtration device of embodiment 20 or 21, wherein the modular filter further comprises a detachable handle plate comprising a handle opposite the docking face.

Embodiment 23. The filtration device of embodiment 22, wherein the outer hollow cylinder, inner hollow cylinder, front cap, detachable docking face, back cap, and detachable handle plate are all made of polyvinyl chloride (PVC).

Embodiment 24. The filtration device of any of embodiments 1 to 23, wherein the quick disconnect plumbing couplings are shut-off couplings.

Embodiment 25. The filtration device of any of embodiments 1 to 24, wherein the modular docking plate comprises interleaving features to allow a plurality of docking plates to be mounted on a structural element in close proximity to other docking plates.

Embodiment 26. A modular filtration system comprising a plurality of the filtration devices of any of embodiments 1 to 25.

Embodiment 27. The modular filtration system of embodiment 26, wherein the plurality of filtration devices are mounted in a tile-like fashion on structural elements.

Embodiment 28. The modular filtration system of embodiment 26 or 27, where the plurality of filtration devices are interleaved.

Embodiment 29. A device comprising: a modular docking plate interleaved and mounted in a tile-like fashion on a variety of a structural elements, the modular docking plate includes: at least one quick disconnect plumbing connection; at least one electrical connector; at least one alignment feature for aligning and receiving a filter; a locking mechanism to hold the filter in place during operation; and optionally, a mounting feature for a power supply that provides power for the filter.

Embodiment 30. The device of embodiment 29, wherein the filter includes carbon electrodes.

Embodiment 31. The device of embodiment 30, wherein the carbon electrode are carbon-based materials.

Embodiment 32. A modular filter comprising: at least one quick disconnect plumbing connection; at least one electrical connector; and an alignment feature that aligns with a mating feature on a docking plate to ensure proper alignment and engagement of the at least one quick disconnect plumbing connection and the at least one electrical connector and necessary features to engage a docking plate locking mechanism.

Embodiment 33. The modular filter of embodiment 32, wherein the modular filter includes carbon electrodes.

Embodiment 34. The modular filter of embodiment 33, wherein the carbon electrodes are carbon-based materials.

Embodiment 35. The modular filter of embodiment 32, wherein the modular filter is mounted to the docking plate using an engagement motion along the longitudinal axis of the filter that engages the alignment feature first, followed by the docking plate locking mechanism pulling the filter into its final position so that the electrical and plumbing connections are fully seated.

Embodiment 36. The modular filter of embodiment 35, wherein the modular filter is removed from the docking plate by disengaging the docking plate locking mechanism, followed by a longitudinal pulling motion to remove the filter.

Embodiment 37. The modular filter of embodiment 36, wherein the filter includes a handle to facilitate handling of the filter during installation and removal.

Embodiment 38. The modular filter of embodiment 35, wherein the locking mechanism includes a spiral groove lock with a circular ring that is mounted on the docking plate, rotates about a longitudinal axis aligned with the longitudinal axis of the filter, and has at least one cam follower mounted on it.

Embodiment 39. The modular filter of embodiment 38, wherein the spiral groove lock has spiral grooves in an outer diameter of the cylindrical surface to receive the at least one cam follower.

Embodiment 40. The modular filter of embodiment 39, wherein a handle is mounted on the circular ring to effect rotation of the circular ring once the at least one cam follower is engaged in the spiral grooves.

Embodiment 41. The modular filter of embodiment 40, wherein the handle is rotated until the at least one cam follower pulls the filter into its fully engaged and seated position.

Embodiment 42. The modular filter of embodiment 41, wherein the spiral lock includes a small seating bump at an end of the spiral grooves to provide the at least one cam follower a location to sit and lock into place.

Embodiment 43. The modular filter of embodiment 42, wherein the modular filter is removed by reversing installation.

Embodiment 44. The modular filter of embodiment 32, wherein the docking plate includes interleaving features to allow a plurality of plates to be mounted on a structural element in close proximity to other docking plates.

Embodiment 45. The modular filter of embodiment 44, wherein the docking plate further comprises mounting holes, at interleaving locations, to allow the docking plate to be mounted to the structural elements.

Various embodiments are described herein with reference to the related drawings. Alternative embodiments can be devised without departing from the scope of the modular filtration devices and systems disclosed herein. Although various connections and positional relationships (e.g., front, back, side, adjacent, over etc.) are set forth between elements in the description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the modular filtration devices and systems are not intended to be limiting in this respect. Thus, the term "connection" and equivalent terms can refer to an indirect "connection", with intervening parts, or a direct "connection", without intervening parts. As an example of an indirect positional relationship, a connection of part "A" to part "B" includes embodiments in which one or more intermediate parts (e.g., part "C") lies between part "A" and part "B" as long as the relevant characteristics and functionalities of part "A" and part "B" are not substantially changed by the intermediate part(s).

The following definitions are to be used for the interpretation of the claims and the specification. As used herein, the terms "comprises", "comprising", "includes", "including", "has", "having", "contains", "containing", "is composed of", "composed of", or any other variation thereof, are intended to cover a non-exclusive inclusion. For example, a device or system that comprises a list of elements is not necessarily limited to only those elements but can include other elements not expressly listed or inherent to such device of system.

The term "exemplary" as used herein means "serving as an example, instance or illustration." Any embodiment or design described herein as "exemplary" is not necessarily to be construed as preferred or advantageous over other embodiments or designs. The articles "a" and "an" and "the" as used herein do not denote a limitation of quantity and are to be construed to cover both the singular and the plural, unless otherwise indicated herein or clearly contradicted by context. "Or" means "and/or" unless clearly stated otherwise.

The terms "at least one" and "one or more" are understood to include any integer number greater than or equal to one, i.e. one, two, three, four, etc. The term "a plurality of" refers to any integral number greater than or equal to two, i.e. two, three, four, five, etc.

The terms "upper", "lower", "top", "bottom", "right", "left", "vertical", "horizontal", and related positional terms shall relate to the described structures and methods, as oriented in the drawings. The terms "overlying", "atop", "on top", "positioned on", or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary structures at the interface of the two elements.

The terms "about", "substantially", "approximately", and variations thereof are intended to include the degree of error associated with measurement of the particular quantity based upon the equipment available at the time of filing the application. For example, "about" can include a range of ±10%, ±5%, or ±1% of a given value.

The corresponding structures, materials, acts, and equivalents of all means or step plus function elements in the claims are intended to include any structure, material, or act for performing the function in combination with other claimed elements as specifically claimed. The descriptions of the filtration devices and filtration systems have been presented for purposes of illustration, but are not intended to be exhaustive or limited to the forms disclosed. Many modifications and variations will be apparent to those of ordinary skill in the art without departing from the scope and spirit of this disclosure. The embodiments were chosen and described in order to best explain the principles and practical application of the filtration devices and filtration systems, and to enable others of ordinary skill in the art to understand the various embodiments with various modifications appropriate for any particular use contemplated.

References in the specification to "one embodiment", "an embodiment", "some embodiments", etc. indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to include such feature, structure, or characteristic in connection with other embodiments whether or not explicitly described.

While the preferred embodiments of the filtration devices and filtration systems are described, those skilled in the art, both now and in the future, may make various improvements and enhancements which fall within the scope of the claims which follow.

What is claimed is:

1. A modular filtration device comprising:
   a modular docking plate comprising:
     at least one quick disconnect plumbing coupling;
     at least one electrical connector;
     at least one alignment feature for aligning and receiving a modular filter; and
     optionally, a mounting feature for a power supply that provides power to the filter; and
   a modular filter comprising a docking face comprising:
     at least one quick disconnect plumbing coupling;
     at least one electrical connector; and
     at least one alignment feature that mates with an alignment feature of the modular docking plate to provide proper alignment of the filter with the docking plate, engagement of the quick disconnect plumbing couplings of the docking plate and the filter, engagement of the electrical connectors of the docking plate and the filter, and engagement of a lock;
   wherein the modular filtration device comprises the lock to hold the filter in place during operation; and
   wherein the at least one alignment feature of the modular filter extends axially from the modular docking plate when directly coupled with the modular docking plate.

2. The filtration device of claim 1, wherein the filtration device is an electrochemical device for purifying an aqueous solution.

3. The filtration device of claim 1, wherein the deionization cell is a capacitive deionization (CDI) cell, membrane capacitive deionization (MCDI) cell, inverted capacitive deionization (i-CDI) cell, capacitive coagulation cell (CCC), electrodialysis reversal (EDR) cell, or faradic porosity cell (FPC).

4. The filtration device of claim 3, wherein the deionization cell is the faradic porosity cell (FPC).

5. The filtration device of claim 1, wherein each of the plurality of electrodes is wrapped around an inner cylinder and encased by an outer cylinder, wherein the inner cylinder, the plurality of electrodes, and the outer cylinder are coaxial.

6. The filtration device of claim 1, wherein the lock comprises a locking ring that is mounted on the modular docking plate,
   the locking ring rotates about a longitudinal axis aligned with the longitudinal axis of the modular filter and has at least one cam follower mounted on an inner surface of the locking ring, and
   the at least one cam follower engages with a spiral groove on the outer surface of the modular filter to lock the modular filter into place.

7. The filtration device of claim 6, wherein the modular filter is mounted to the modular docking plate using a linear engagement motion along the longitudinal axis of the filter, which engages the at least one alignment feature first, followed by rotation of the locking ring pulling the filter and its electrical and plumbing connections into fully engaged and seated positions.

8. The filtration device of claim 7, wherein the locking ring is rotated until the at least one cam follower pulls the filter into its fully engaged and seated position by fully engaging with the at least one spiral groove of the modular filter.

9. The filtration device of claim 7, wherein the modular filter is dismounted from the modular docking plate by reversing mounting.

10. The filtration device of claim 7, wherein the modular filter is dismounted from the modular docking plate by rotation of the locking ring in the opposite direction, which disengages and unseats the filter and electrical and plumbing connections, followed by a linear disengagement motion along the longitudinal axis to remove the filter.

11. The filtration device of claim 1, wherein the modular filter comprises a handle to facilitate handling of the filter during mounting and dismounting.

12. The filtration device of claim 6, wherein a locking ring handle is mounted on the locking ring to facilitate rotation of the locking ring once the at least one cam follower is aligned with the at least one spiral groove of the modular filter.

13. The filtration device of claim 6, wherein the filtration device further comprises a ball detent, comprising a spring-actuated ball positioned on the locking ring to engage with a detent on the modular docking plate when the at least one cam follower is fully engaged with the at least one spiral groove so as to lock the modular filter into place.

14. The filtration device of claim 1, wherein the longitudinal axis of the filtration module is horizontal.

15. The filtration device of claim 1, wherein the at least one alignment feature of the modular filter is a male key block and the alignment feature of the modular docking plate is a female key block.

16. The filtration device of claim 1, wherein the modular filter comprises an outer hollow cylinder, an inner hollow cylinder, a front cap, and a back cap.

17. The filtration device of claim 1, wherein the docking face is detachable.

18. The filtration device of claim 16, wherein the modular filter further comprises a detachable handle plate comprising a handle opposite the docking face.

19. The filtration device of claim 18, wherein the outer hollow cylinder, inner hollow cylinder, front cap, detachable docking face, back cap, and detachable handle plate are all made of polyvinyl chloride (PVC).

20. The filtration device of claim 1, wherein the quick disconnect plumbing couplings are shut-off couplings.

21. The filtration device of claim 1, wherein the modular docking plate comprises interleaving features to allow a plurality of docking plates to be mounted on a structural element in close proximity to other docking plates.

22. A modular filtration system comprising a plurality of the filtration devices of claim 1.

23. The modular filtration system of claim 22, wherein the plurality of filtration devices are mounted in a tile-like fashion on structural elements.

24. The modular filtration system of claim 22, where the plurality of filtration devices are interleaved.

25. A modular filtration device comprising:
   a modular docking plate comprising:
      at least one quick disconnect plumbing coupling;
      at least one electrical connector;
      at least one alignment feature for aligning and receiving a modular filter; and
      optionally, a mounting feature for a power supply that provides power to the filter; and
   a modular filter comprising a docking face comprising:
      at least one quick disconnect plumbing coupling;
      at least one electrical connector; and
      at least one alignment feature that mates with an alignment feature of the modular docking plate to provide proper alignment of the filter with the docking plate, engagement of the quick disconnect plumbing couplings of the docking plate and the filter, engagement of the electrical connectors of the docking plate and the filter, and engagement of a lock;
      wherein the modular filtration device comprises the lock to hold the filter in place during operation;
   wherein the at least one alignment feature of the modular filter extends axially from the modular docking plate when directly coupled with the modular docking plate; and
   wherein the modular filter comprises a plurality of electrodes, the plurality of electrodes comprising a carbon electrode, wherein at least one electrode of the plurality of electrodes is the carbon electrode and comprises at least one of activated carbon, porous carbon, macroporous carbon, mesoporous carbon, microporous carbon, carbon xerogel, carbon aerogel, graphene, carbon nanofibers, carbon nanotubes, surface-modified carbon, silica-coated carbon, carbon block, carbon film, activated carbon film, carbon felt, or carbon cloth.

26. The filtration device of claim 25, in which the flow of the aqueous solution through the plurality of electrodes is axial flow.

* * * * *